(12) United States Patent
Chapman et al.

(10) Patent No.: US 7,656,890 B2
(45) Date of Patent: Feb. 2, 2010

(54) DOWNSTREAM CHANNEL CHANGE TECHNIQUE IMPLEMENTED IN AN ACCESS NETWORK

(75) Inventors: John T. Chapman, Cupertino, CA (US); Daniel W. Crocker, San Jose, CA (US); Feisal Y. Daruwalla, Fremont, CA (US); Joanna Qun Zang, San Jose, CA (US); Yong Lu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 305 days.

(21) Appl. No.: 11/484,288

(22) Filed: Jul. 10, 2006

(65) Prior Publication Data

US 2006/0262722 A1 Nov. 23, 2006

Related U.S. Application Data

(62) Division of application No. 09/606,503, filed on Jun. 28, 2000, now Pat. No. 7,113,484.

(60) Provisional application No. 60/159,085, filed on Oct. 13, 1999.

(51) Int. Cl.
  *H04L 12/28* (2006.01)
  *H04J 3/16* (2006.01)
  *H04J 3/22* (2006.01)

(52) U.S. Cl. .................... 370/431; 370/468

(58) Field of Classification Search ............ 370/431, 370/465, 468
  See application file for complete search history.

(56) References Cited

U.S. PATENT DOCUMENTS

| | | | |
|---|---|---|---|
| 5,384,563 | A | 1/1995 | Massey |
| 5,414,704 | A | 5/1995 | Spinney |
| 5,488,412 | A | 1/1996 | Majeti et al. |
| 5,506,987 | A | 4/1996 | Abramson et al. |
| 5,586,121 | A | 12/1996 | Moura et al. |
| 5,604,735 | A | 2/1997 | Levinson et al. |
| RE35,774 | E | 4/1998 | Moura et al. |

(Continued)

OTHER PUBLICATIONS

3COM, "High-Speed Cable Internet Solutions," http://www.3com.com/cablenow/pdf/7125dsht.pdf, 4 pages (Dec. 1999).

(Continued)

*Primary Examiner*—Kevin C Harper
(74) *Attorney, Agent, or Firm*—Weaver Austin Villeneuve & Sampson LLP

(57) ABSTRACT

A dynamic channel change technique is disclosed which may be implemented between nodes and a Head End of an access network. Initially a network device may communicate with the Head End via a first downstream channel and a first upstream channel. When the network device receives a dynamic channel change request which includes instructions for the network device to switch to a second downstream channel, the network device may respond by switching from the first downstream channel to the second downstream channel. Thereafter, the network device may communicate with the Head End via the second downstream channel and first upstream channel. Further, according to a specific embodiment, the dynamic channel change request may also include an upstream channel change request for causing the network device to switch from a first upstream channel to a second upstream channel.

30 Claims, 14 Drawing Sheets

U.S. PATENT DOCUMENTS

| | | | |
|---|---|---|---|
| 5,751,200 | A | 5/1998 | Ghaffari |
| 5,784,597 | A | 7/1998 | Chiu et al. |
| 5,790,806 | A | 8/1998 | Koperda |
| 5,818,845 | A | 10/1998 | Moura et al. |
| 5,828,655 | A | 10/1998 | Moura et al. |
| 5,854,793 | A | 12/1998 | Dinkins |
| 5,859,852 | A | 1/1999 | Moura et al. |
| 5,872,773 | A | 2/1999 | Katzela et al. |
| 5,892,903 | A | 4/1999 | Klaus |
| 5,931,954 | A | 8/1999 | Hoshina et al. |
| 5,933,420 | A | 8/1999 | Jaszewski et al. |
| 5,946,047 | A | 8/1999 | Levan |
| 5,946,048 | A | 8/1999 | Levan |
| 5,950,205 | A | 9/1999 | Aviani, Jr. |
| 5,953,335 | A | 9/1999 | Erimli et al. |
| 5,956,346 | A | 9/1999 | Levan |
| 5,959,660 | A | 9/1999 | Levan |
| 5,959,968 | A | 9/1999 | Levan |
| 5,959,997 | A | 9/1999 | Moura et al. |
| 5,963,557 | A | 10/1999 | Eng |
| 5,989,060 | A | 11/1999 | Coile et al. |
| 6,006,266 | A | 12/1999 | Murph et al. |
| 6,016,388 | A | 1/2000 | Dillon |
| 6,023,769 | A | 2/2000 | Gonzalez |
| 6,052,718 | A | 4/2000 | Gifford |
| 6,078,595 | A | 6/2000 | Jones et al. |
| 6,101,180 | A | 8/2000 | Donahue et al. |
| 6,137,793 | A | 10/2000 | Gorman et al. |
| 6,233,246 | B1 | 5/2001 | Hareski et al. |
| 6,345,294 | B1 | 2/2002 | O'Toole et al. |
| 6,370,159 | B1 | 4/2002 | Eidson |
| 6,381,214 | B1 | 4/2002 | Prasad |
| 6,418,324 | B1 | 7/2002 | Doviak et al. |
| 6,459,703 | B1 | 10/2002 | Grimwood et al. |
| 6,467,091 | B1 | 10/2002 | Lin et al. |
| 6,490,727 | B1 | 12/2002 | Nazarathy et al. |
| 6,505,254 | B1 | 1/2003 | Johnson et al. |
| 6,510,162 | B1 | 1/2003 | Fijolek et al. |
| 6,556,591 | B2 | 4/2003 | Bernath et al. |
| 6,693,878 | B1 | 2/2004 | Daruwalla et al. |
| 6,697,970 | B1 | 2/2004 | Chisholm |
| 6,698,022 | B1 | 2/2004 | Wu |
| 6,763,032 | B1 | 7/2004 | Rabenko et al. |
| 6,771,606 | B1 | 8/2004 | Kuan |
| 6,785,292 | B1 | 8/2004 | Vogel |
| 6,857,132 | B1 | 2/2005 | Rakib et al. |
| 6,917,591 | B2 | 7/2005 | St. John |
| 6,917,614 | B1 * | 7/2005 | Laubach et al. ............. 370/392 |
| 7,065,779 | B1 | 6/2006 | Crocker et al. |
| 7,085,287 | B1 | 8/2006 | Chapman |
| 7,113,484 | B1 | 9/2006 | Chapman et al. |
| 7,139,923 | B1 | 11/2006 | Chapman et al. |
| 7,149,771 | B1 | 12/2006 | Gifford |
| 7,209,442 | B1 | 4/2007 | Chapman |
| 7,349,430 | B1 | 3/2008 | Chapman |
| 2002/0010750 | A1 | 1/2002 | Baretzki |
| 2002/0136203 | A1 | 9/2002 | Liva et al. |
| 2002/0161924 | A1 | 10/2002 | Perrin et al. |
| 2002/0198967 | A1 | 12/2002 | Iwanojko et al. |
| 2003/0214943 | A1 | 11/2003 | Engstrom et al. |
| 2005/0018697 | A1 | 1/2005 | Enns et al. |
| 2006/0251097 | A1 | 11/2006 | Chapman et al. |

OTHER PUBLICATIONS

Data-Over-Cable Service Interface Specifications, Radio Frequency Interface Specification, SP-RF1-104-980724, Jul. 24, 1998; 304 pgs.
Chapman et al., "Dynamic Channel Change Proposal for DOCSIS Standard," U.S. Appl. No. 60/159,085, filed on Oct. 13, 1999, 23.
Crocker et al., "Technique for Synchronizing Multiple Access Controllers at the Head of an Access Network," U.S. Appl. No. 09/490,761, 63 pgs.
U.S. Office Action dated Jun. 18, 2003 from U.S. Appl. No. 09/490,761; 30 pgs.
U.S. Final Office Action dated Nov. 19, 2003 from U.S. Appl. No. 09/409,761, 16 pgs.
Notice of Allowance and Allowed Claims dated Jan. 26, 2004 from U.S. Appl. No. 09/409,761, 22 pgs.
Notice of Allowance and Allowed Claims dated Mar. 28, 2005 from U.S. Appl. No. 09/409,761, 24 pgs.
Notice of Allowance and Allowed Claims dated Nov. 28, 2005 from U.S. Appl. No. 09/490,761, 20 pgs.
Chapman et al., "Downstream Channel Change Technique Implemented in an Access Network," U.S. Appl. No. 09/606,503, 72 pgs.
U.S. Office Action dated Jun. 27, 2005 from U.S. Appl. No. 09/606,503; 9 pgs.
U.S. Office Action dated Nov. 29, 2005 from U.S. Appl. No. 09/606,503; 6 pgs.
Notice of Allowance and Allowed Claims dated Apr. 20, 2006 from U.S. Appl. No. 09/606,503; 20 pgs.
Cable Television Laboratories, Inc., Interim Specification, "Data-Over-Cable Service Interface Specifications, Radio Frequency Interface Specification, SP-RFIv1.1-102-990731," Jul. 31, 1999, 332 pgs.
Cable Television Laboratories, Inc., Interim Specification, "Data-Over-Cable Service Interface Specifications, Radio Frequency Interface Specification, SP-RFIv1.1-104-000407," Apr. 7, 2000, 392 pgs.
U.S. Office Action dated Sep. 19, 2005 from U.S. Appl. No. 09/984,958; 8 pgs.
U.S. Final Office Action dated Mar. 16, 2006 from U.S. Appl. No. 09/984,958; 8 pgs.
Notice of Allowance and Allowed Claims dated Oct. 3, 2006 from U.S. Appl. No. 09/984,958; 9 pgs.
Notice of Allowance and Allowed Claims dated Dec. 13, 2006 from U.S. Appl. No. 09/984,958; 10 pgs.
Notice of Allowance and Allowed Claims dated Jan. 30, 2007 from U.S. Appl. No. 09/984,958; 11 pgs.
U.S. Office Action dated Sep. 21, 2004 from U.S. Appl. No. 09/984,864; 7 pgs.
U.S. Office Action dated Mar. 8, 2005 from U.S. Appl. No. 09/984,864; 4 pgs.
U.S. Office Action dated May 31, 2005 from U.S. Appl. No. 09/984,864; 7 pgs.
U.S. Final Office Action dated Oct. 18, 2005 from U.S. Appl. No. 09/984,864; 8 pgs.
Notice of Allowance dated Jan. 20, 2006 from U.S. Appl. No. 09/984,864; 4 pgs.
Notice of Allowance and Allowed Claims dated Jun. 19, 2006 from U.S. Appl. No. 09/984,864; 19 pgs.
U.S. Office Action dated Sep. 18, 2008 from U.S. Appl. No. 11/417,759; 6 pgs.
U.S. Final Office Action dated Feb. 24, 2009 from U.S. Appl. No. 11/417,759; 6 pgs.
Notice of Allowance and Allowed Claims dated Mar. 24, 2009 from U.S. Appl. No. 11/417,759; 4 pgs.
Supplemental Notice of Allowance dated Apr. 29, 2009 from U.S. Appl. No. 11/417,759; 2 pgs.
Chapman, "Map Routing Technique Implemented in Access Networks," U.S. Appl. No. 09/894,852, filed on Jun. 27, 2001; 74 pgs.
U.S. Office Action dated Oct. 4, 2005 from Application No. 09/894,852; 9 pgs.
Notice of Allowance and Allowed Claims dated Mar. 7, 2006 from U.S. Appl. No. 09/894,852; 22 pgs.
Eager et al., "Adaptive Load Sharing in Homogeneous Distributed Systems," IEEE, Transactions on Software Engineering, vol. SE-12, No. 5, May 1986, pp. 662-675.
Akamai Technologies, Inc. - Global Internet Content Delivery-"How FreeFlow Works," webmaster@akamai.com 1999-2000; 3 pgs.
Digital Island, Inc. -e-Business Without Limits-, "Enabling Technologies," http://www.digisle.net. No date.
Internap, "Preferred Collocation Services," http://www.internap.com Copyright© 2001 Internap Network Services Corporation; 2 pgs.

Meyer et al., Request for Comments No. 2026, entitle, Generic Routing Encapsulation (GRE),: Jan. 2000, Internet Engineering Task Force, 9 pgs.

Mockapetris, P., Request for Comments No. 1034, entitled, "Domain Names-Concepts and Facilites," Nov. 1987, Internet Engineering Task Force, 31 pgs.

Information Sciences Institute, Request for Comments No. 793, entitled, "Transmission Control Protocol - DARPA Internet Program - Protocol Specification," Sep. 1981, Internet Engineering Task Force, 49 pgs.

Johnson et al., "Dynamic Server Organization," U.S. Appl. No. 09/294,837 Filed Apr. 19, 1999, 45 pgs.

Lu et al., "Automatic Network Addresses Assignment and Translation Interferences," U.S. Appl. No. 60/160,535, Filed Oct. 20, 1999, 127 pgs.

David M. Gifford, "Replica Routing," U.S. Appl. No. 09/742,964, Filed Dec. 28, 1999, 37 pgs.

Lu et al., "Method and Apparatus for Automatic Network Address Assignment," U.S. Appl. No. 60/178,063, Filed Jan. 24, 2000, 74 pgs.

Johnson et al., "Method and Apparatus for Determining a Network Topology in the Presence of Network Address Translation," U.S. Appl. No. 60/178,062, Filed Jan. 24, 2000, 32 pgs.

Toole et al., "Fast-Changing Network Status and Load Monitoring and Feedback," U.S. Appl. No. 60/177,985, Filed Jan. 25, 2000, 20 pgs.

Kirk Johnson, "A Method and Apparatus for Minimalist Approach to Implementing Server Selection, "U.S. Appl. No. 60/177,415, Filed Jan. 21, 2000, 39 pgs.

Chapman, "Addressing Scheme Implemented in Access Networks," U.S. Appl. No. 09/895,809 filed on Jun. 27, 2001, 76 pgs.

U.S. Office Action dated Dec. 20, 2005 from Application No. 09/895,809; 11 pgs.

U.S. Office Action dated May 26, 2006 from U.S. Appl. No. 09/895,809; 9 pgs.

* cited by examiner

DOWNSTREAM CHANNEL CHANGE TECHNIQUE IMPLEMENTED IN AN ACCESS NETWORK

RELATED APPLICATION DATA

The present application is a divisional application pursuant to 35 USC 120 from U.S. patent application Ser. No. 09/606,503, filed on Jun. 28, 2000, now U.S. Pat. No. 7,113,484 and entitled, "DOWNSTREAM CHANNEL CHANGE TECHNIQUE IMPLEMENTED IN AN ACCESS NETWORK", which claims benefit under 35 USC 119(e) from U.S. Provisional Patent Application Ser. No. 60/159,085, filed on Oct. 13, 1999, and entitled "DYNAMIC CHANNEL CHANGE PROPOSAL FOR DOCSIS STANDARD"; and which further claims priority under 35 USC 120 from U.S. patent application Ser. No. 09/490,761, filed on Jan. 24, 2000, and entitled, "TECHNIQUE FOR SYNCHRONIZING MULTIPLE ACCESS CONTROLLERS AT THE HEAD END OF AN ACCESS NETWORK". Each of these applications is incorporated herein by reference in its entirety and for all purposes.

BACKGROUND OF THE INVENTION

This invention relates to digital computer network technology. More specifically, it relates to methods and apparatus for implementing dynamic channel changes at nodes of an access network.

Broadband access technologies such as cable, fiber optic, and wireless have made rapid progress in recent years. Recently there has been a convergence of voice and data networks which is due in part to US deregulation of the telecommunications industry. In order to stay competitive, companies offering broadband access technologies need to support voice, video, and other high-bandwidth applications over their local access networks. For networks that use a shared access medium to communicate between subscribers and the service provider (e.g., cable networks, wireless networks, etc.), providing reliable high-quality voice/video communication over such networks is not an easy task.

One type of broadband access technology relates to cable modem networks. A cable modem network or "cable plant" employs cable modems, which are an improvement of conventional PC data modems and provide high speed connectivity. Cable modems are therefore instrumental in transforming the cable system into a full service provider of video, voice and data telecommunications services. Digital data on upstream and downstream channels of the cable network is carried over radio frequency ("RF") carrier signals. Cable modems convert digital data to a modulated RF signal for upstream transmission and convert downstream RF signal to digital form. The conversion is done at a subscriber's facility. At a Cable Modem Termination System ("CMTS"), located at a Head End of the cable network, the conversions are reversed. The CMTS converts downstream digital data to a modulated RF signal, which is carried over the fiber and coaxial lines to the subscriber premises. The cable modem then demodulates the RF signal and feeds the digital data to a computer. On the return path, the digital data is fed to the cable modem (from an associated PC for example), which converts it to a modulated RF signal. Once the CMTS receives the upstream RF signal, it demodulates it and transmits the digital data to an external source.

FIG. 1 is a block diagram of a typical two-way hybrid fiber-coaxial (HFC) cable network system. It shows a Head End 102 (essentially a distribution hub) which can typically service about 40,000 homes. Head End 102 contains a CMTS 104 that is needed when transmitting and receiving data using cable modems. Primary functions of the CMTS include (1) receiving baseband data inputs from external sources 100 and converting the data for transmission over the cable plant (e.g., converting Ethernet or ATM baseband data to data suitable for transmission over the cable system); (2) providing appropriate Media Access Control (MAC) level packet headers for data received by the cable system, and (3) modulating and demodulating the data to and from the cable system.

Head End 102 connects through pairs of fiber optic lines 106 (one line for each direction) to a series of fiber nodes 108. Each Head End can support normally up to 80 fiber nodes. Pre-HFC cable systems used coaxial cables and conventional distribution nodes. Since a single coaxial cable was capable of transmitting data in both directions, one coaxial cable ran between the Head End and each distribution node. In addition, because cable modems were not used, the Head End of pre-HFC cable systems did not contain a CMTS. Returning to FIG. 1, each of the fiber nodes 108 is connected by a coaxial cable 110 to two-way amplifiers or duplex filters 112, which permit certain frequencies to go in one direction and other frequencies to go in the opposite direction (different frequency ranges are used for upstream and downstream paths). Each fiber node 108 can normally service up to 2000 subscribers. Fiber node 108, coaxial cable 110, two-way amplifiers 112, plus distribution amplifiers 114 along with trunk line 116, and subscriber taps, i.e. branch lines 118, make up the coaxial distribution system of an HFC system. Subscriber tap 118 is connected to a cable modem 120. Cable modem 120 is, in turn, connected to a network device 122, such as a subscriber computer.

In order for data to be able to be transmitted effectively over a wide area network such as HFC or other broadband computer networks, a common standard for data transmission is typically adopted by network providers. A commonly used and well known standard for transmission of data or other information over HFC networks is the Data Over Cable System Interface Specification (DOCSIS). The DOCSIS standard has been publicly presented by Cable Television Laboratories, Inc. (Louisville, Colo.), in a document entitled, DOCSIS 1.1 RF Interface Specification (document control number SP-RFIv1.1-I04-000407, Apr. 7, 2000). That document is incorporated herein by reference for all purposes.

Data Communication in Cable Networks

In conventional DOCSIS systems, the CMTS may include a plurality of physically distinct line cards having appropriate hardware for communicating with cable modems in the network. Each line card is typically assigned to a separate DOCSIS domain, which is a collection of downstream and upstream channels for which a single MAC Allocation and Management protocol operates. Typically, each DOCSIS domain includes a single downstream channel and one or more upstream channels. The downstream channel is used by the CMTS to broadcast data to all cable modems (CMs) within that particular domain. Only the CMTS may transmit data on the downstream. In order to allow the cable modems of a particular DOCSIS domain to transmit data to the CMTS, the cable modems share one or more upstream channels within that domain. Access to the upstream channel is controlled using a time division multiplexing (TDM) approach. Such an implementation requires that the CMTS and all cable modems sharing an upstream channel within a particular domain have a common concept of time so that when the CMTS tells a particular cable modem to transmit data at time T, the cable modem understands what to do. "Time" in this context may be tracked using a counter, commonly referred to as a timestamp counter, which, according to conventional implementations is a 32-bit counter that increments by one every clock pulse.

FIG. 2 shows a block diagram of a conventional configuration for a cable network 200. As shown in FIG. 2, the CMTS 210 may include a plurality of physically distinct line cards, e.g. line card A 202 and line card B 204. Each line card provides a separate interface for communicating with a specific group of cable modems in the network. For example, line card A 202 includes a distinct group of ports (e.g., 205, 212) for communicating with cable modem Group A 260a, and line card B includes a separate distinct group of ports (e.g., 225, 222) for communicating with cable modem Group B 260b.

Each line card within CMTS 210 includes a separate MAC controller for controlling the group of ports which reside on that physical line card. For example, on line card A, MAC controller 206 controls downstream transmitter 212 and the plurality of upstream receivers 205. Similarly, the MAC controller 208 on line card B controls downstream transmitter 222 and the plurality of upstream receivers 225.

According to conventional techniques, each MAC controller includes its own unique timestamp counter for generating a local time reference specific to the particular line card on which it resides. Thus, for example, MAC controller 206 includes a first timestamp counter (not shown) which generates a local time reference to be used by line card A for communicating with the plurality of Group A cable modems. Likewise, MAC controller 208 includes its own timestamp counter (not shown) for generating a local time reference to be used by line card B for communicating with the Group B cable modems. Typically, in conventional CMTS systems, the timestamp counters which reside on different line cards are not synchronized.

Because data-over-cable service is a relatively new and emerging technology, conventional cable networks have been designed to be efficient in handling burst data transmissions from the plurality of network cable modems to the CMTS. Additionally, conventional cable network configurations are designed to take into account the asymmetrical bandwidth allocation on the upstream and downstream channels. For example, a downstream channel will typically have a bandwidth of 30-50 Mbps, and an upstream channel will typically have a bandwidth of 1-10 Mbps. In taking the above factors into account, it is common practice to statically configure each line card to include a single downstream channel transmitter and a pre-determined number of upstream channel receivers (up to a maximum of 6 upstream receivers).

Due to the static configuration of conventional cable networks such as that shown in FIG. 2, it is common practice to assign the downstream and upstream channels of each physical line card within the CMTS to a unique DOCSIS domain. By assigning each line card (and its associated downstream and upstream channels) to a unique DOCSIS domain, one is able to take full advantage of the limited addressing space available within each DOCSIS domain. In the example of FIG. 2, line card A is associated with domain A which includes one downstream A channel 213 and six upstream A channels 219. The cable modems which use the domain A downstream and upstream channels to communicate with the CMTS (e.g., Group A cable modems 260a) are considered to be part of domain A and share a common address map specific to domain A. Similarly, line card B is associated with domain B, which includes a single downstream B channel 223, and a plurality of upstream B channels 229. The cable modems of Group B (260b) which use the domain B upstream and downstream channels to communicate with the CMTS are considered to be part of domain B, and share a common address map specific to domain B. Thus, according to conventional techniques, each cable modem is constrained to use only those upstream or downstream channels associated with a given DOCSIS domain, and is therefore bandwidth limited.

While such a configuration provides for simplicity in terms of implementation, it may not be the most advantageous configuration for handling new and emerging broadband network applications such as video-on-demand, telephony, etc. Accordingly, there exists a continual need to improve access network configurations in order to accommodate new and emerging network applications and technologies.

SUMMARY OF THE INVENTION

In accordance with the several embodiments of the present invention, various methods, systems and computer program products are disclosed for facilitating communications between a network node and a Head End of an access network. The access network includes a plurality of nodes which communicate with the Head End via at least one upstream channel and at least one downstream channel. A first communication is received from the Head End via a first downstream channel. The first communication includes a request to perform a dynamic channel change request which includes a request to perform a downstream channel change operation. In response to the dynamic channel change request, a downstream channel change operation is implemented. A second communication from the Head End is then received via a second downstream channel. Communication with the Head End may then be initiated using data received on the second downstream channel.

According to a specific embodiment, the dynamic channel change technique of the present invention may be implemented at a network device, such as, for example, a cable modem. Initially the network device may communicate with the Head End via a first downstream channel and a first upstream channel. When the network device receives a dynamic channel change request which includes instructions for the network device to switch to a second downstream channel, the network device may respond by switching from the first downstream channel to the second downstream channel. Thereafter, the network device may communicate with the Head End via the second downstream channel and first upstream channel. Further, according to a specific embodiment, the dynamic channel change request may also include an upstream channel change request for causing the network device to switch from a first upstream channel to a second upstream channel.

Alternate embodiments of the present invention are directed to various methods, systems and computer program products for facilitating communications between a network node and a Head End of an access network. The access network includes a plurality of nodes which communicate with the Head End via at least one upstream channel and at least one downstream channel. A bandwidth allocation request from the network node is received on a first upstream channel. Traffic loads on selected upstream and downstream channels are then analyzed for accommodating the bandwidth allocation request from the network node. A particular downstream channel is then selected for accommodating the bandwidth allocation request. A dynamic channel change request is then transmitted to the network node via a first downstream channel. According to a specific embodiment, the dynamic channel change request may include a request for the network node to switch from the first downstream channel to the selected downstream channel in order to thereby receive downstream transmissions on the selected downstream channel.

Further embodiments of the present invention are directed to various methods, systems and computer program products for facilitating communications between the network node and a Head End of an access network. The access network includes a plurality of nodes which communicate with the Head End via at least one upstream channel and at least one downstream channel. A dynamic channel change request is transmitted to a network node via a first downstream channel. The dynamic channel change request includes a request for the node to receive downstream transmissions on a selected downstream channel. At least one bandwidth resource assignment is then allocated on the selected downstream channel for communicating with the network node. According to a specific embodiment, once it is detected that the network node is successfully receiving transmissions on the selected downstream channel, at least one bandwidth resource assignment relating to the network node may be de-allocated on the first downstream channel.

Other embodiments of the present invention are directed to various methods, systems and computer program products for facilitating communications between a network node and a Head End of an access network. The access network includes a plurality of nodes. The system comprises a first network node in communication with the Head End. The first node includes at least one interface configured to communicate with the Head End via at least one upstream channel and at least one downstream channel. The interface is further configured to receive a first communication from the Head End via a first downstream channel. The first communication includes a request to perform a dynamic channel change operation. The dynamic channel change request includes a request to perform a downstream channel change operation. The first node is configured to respond to the dynamic channel change request by implementing the downstream channel change operation, thereby resulting in the first node switching from the first downstream to a second downstream channel for receiving communications from the Head End. The interface is further configured or designed to receive communications from the Head End via the second downstream channel. The first node is configured to communicate with the Head End using data received via the second downstream channel.

Additional embodiments of the present invention are directed to various methods, systems and computer program products for facilitating communications in an access network. The access network includes a plurality of nodes. The system comprises a Head End in communication with at least a portion of the network nodes. The Head End includes a first interface configured to receive data from a first network node via at least one upstream channel. The Head End includes a second interface configured to transmit data to the first network node via at least one downstream channel. The Head End is configured or designed to receive, via the first upstream channel, a bandwidth allocation request from the first node. The Head End is further configured to analyze traffic loads on selected upstream and downstream channels for accommodating the bandwidth allocation request. The Head End is further configured to select a particular downstream channel for accommodating the bandwidth allocation request. The Head End is further configured to transmit to the first node, via a first downstream channel, a dynamic channel change request. According to a specific embodiment, the dynamic channel change request may include a request for the node to receive downstream transmissions on a selected downstream channel which may be different than the first downstream channel.

Additional embodiments of the present invention are directed to various methods, systems and computer program products for facilitating communications in an access network. The access network includes a plurality of nodes. The system comprises a Head End in communication with at least a portion of the network nodes. The Head End includes a first interface configured to receive data from a first network node via at least one upstream channel. The Head End includes a second interface configured to transmit data to the first node via at least one downstream channel. The Head End is further configured to transmit to the network node, via a first downstream channel, a dynamic channel change request which includes a request for the node to receive downstream transmissions on a selected downstream channel. The Head End is further configured to allocate at least one bandwidth resource assignment on the selected downstream channel for communicating with the network node. According to at least one embodiment, the selected downstream channel is different than the first downstream channel.

Additional features and advantages of the various aspects of the present invention will become apparent from the description of its preferred embodiments, which description should be taken in conjunction with the accompanying drawings.

DETAILED DESCRIPTION OF THE PREFERRED EMBODIMENTS

Figure 1:
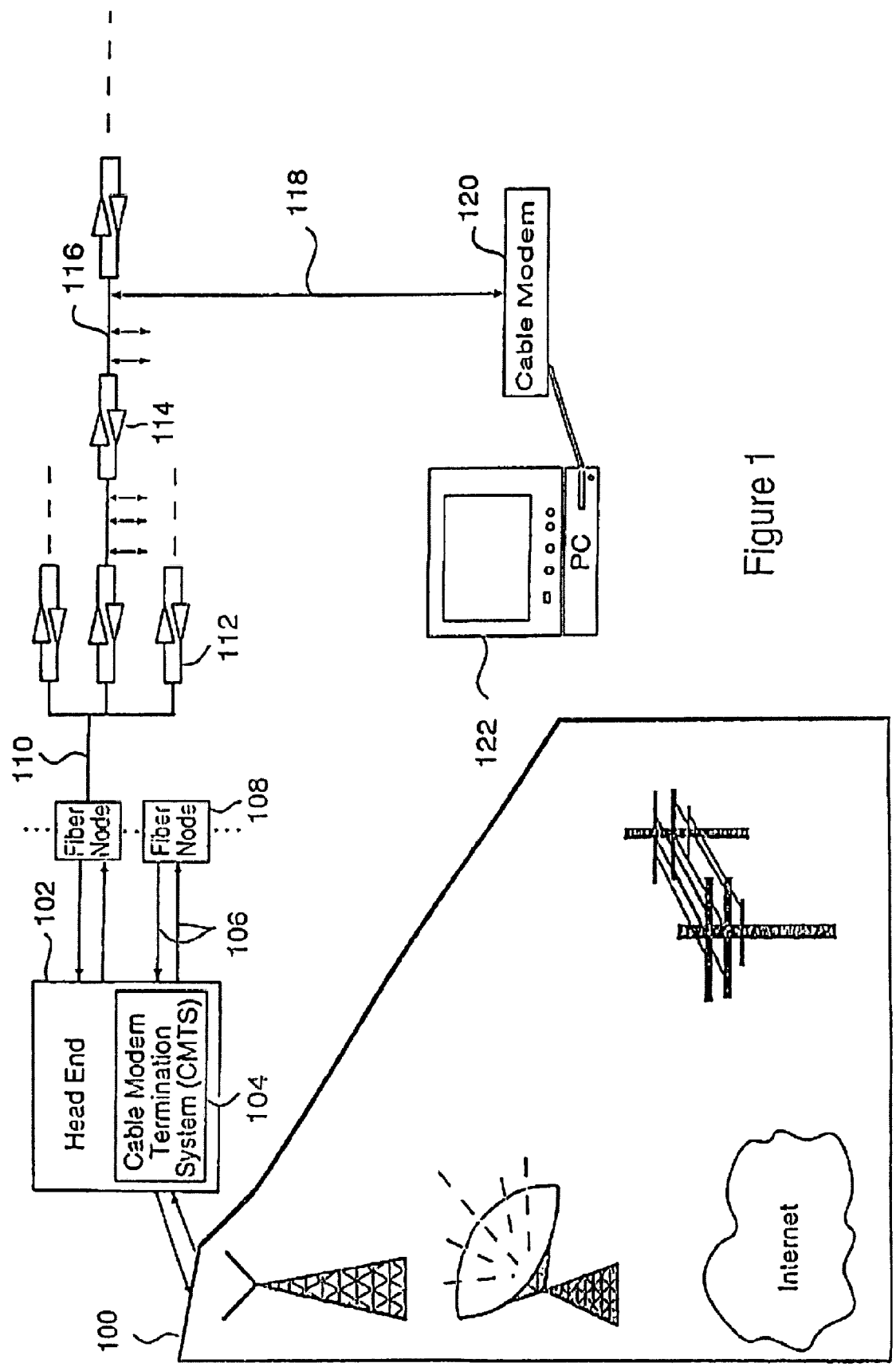
FIG. 1 shows a specific embodiment of a cable network which may be used with the technique of the present invention.
Figure 2:
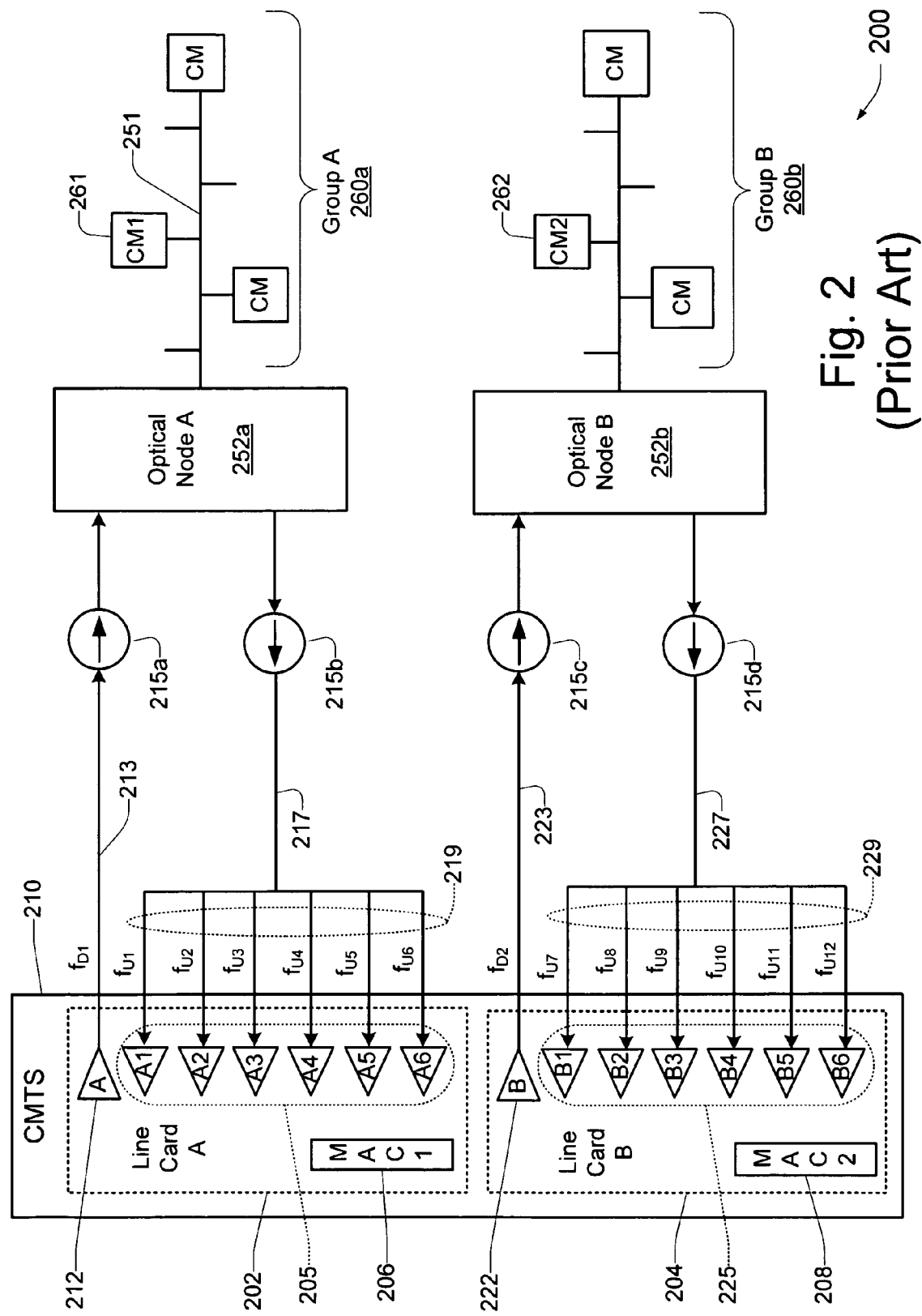
FIG. 2 shows a block diagram of a conventional implementation of a cable network 200.

As described previously, each DOCSIS domain of a conventional HFC network typically includes multiple upstream channels, each upstream channel being associated with a different timeslot. In order to allow the cable modems of a particular domain to communicate effectively with the CMTS, the standard DOCSIS protocol includes provisions for enabling a cable modem of a selected domain to switch between upstream channels within the selected domain. Thus, as shown in FIG. 2, for example, if it is assumed that cable modem CM1 261 is currently transmitting data to the CMTS 210 via upstream channel $f_{U1}$, the CMTS 210 may use the DOCSIS protocol to instruct cable modem CM1 261 to begin transmitting its data to the CMTS via upstream channel $f_{U2}$ (rather than $f_{U1}$). However, since most conventional DOCSIS domain implementations include only one downstream channel, there is currently no provision in the DOCSIS protocol for enabling a cable modem to switch between downstream channels in the HFC network. Moreover, as described in greater detail below, the lack of downstream channel change capability in HFC or other access networks limits the functionality such networks when implementing new and/or emerging broadband network applications such as video-on-demand, telephony, etc.

Accordingly, the present invention provides a technique for implementing downstream and/or upstream channel changes for selected nodes in an HFC or other access network. According to a specific embodiment, the technique of the present invention may be implemented as an additional feature of the standard DOCSIS protocol, which may be used for implementing conventional HFC networks.

Figure 3A:
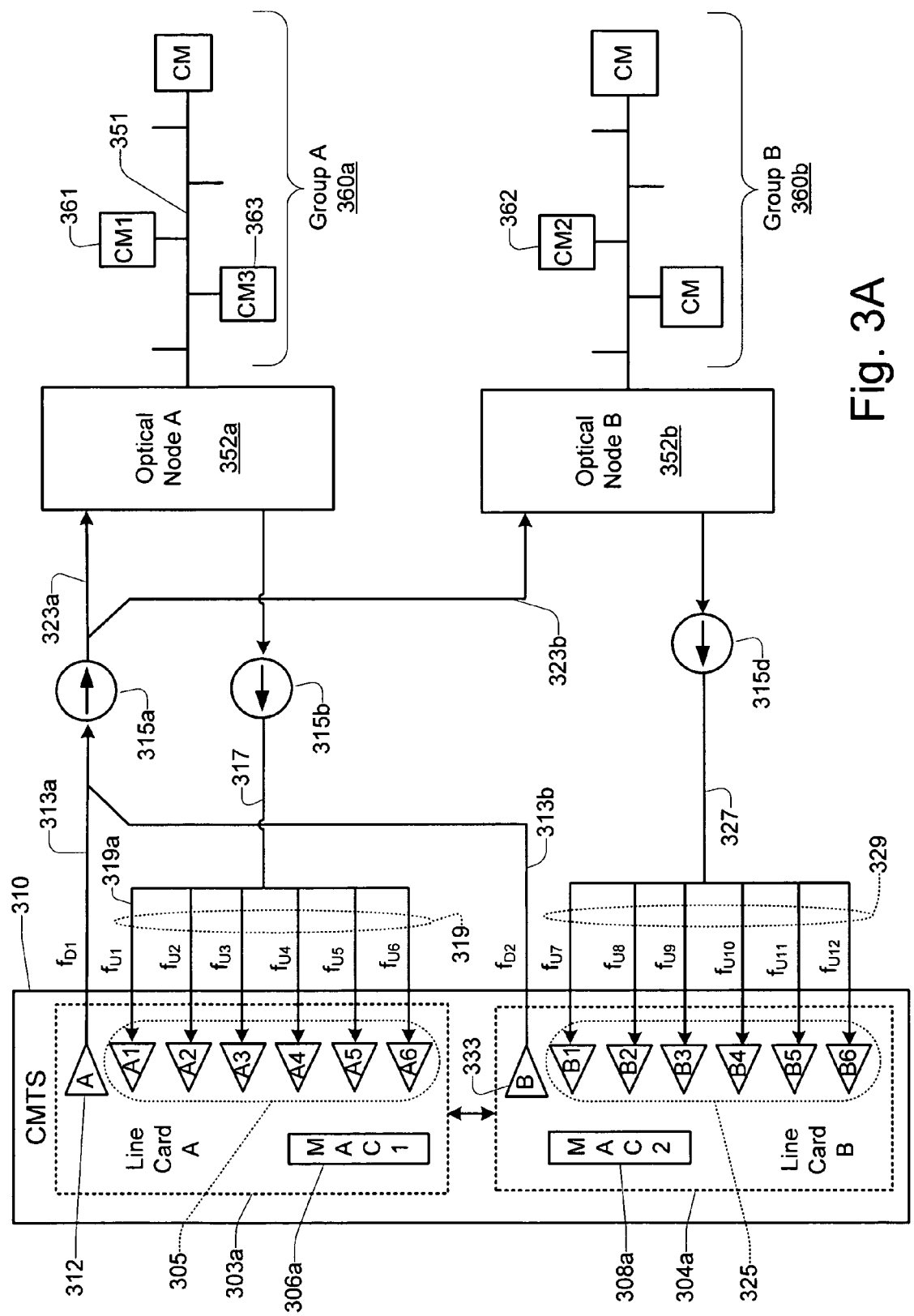
FIG. 3A shows a block diagram of a specific implementation of a cable network in accordance with a specific embodiment of the present invention.

FIG. 3A shows a block diagram of a specific implementation of a cable network in accordance with a specific embodiment of the present invention. A primary difference between the cable network of FIG. 3A and that of FIG. 2 is that, in FIG. 3A, downstream channel A (313a) and downstream channel B (313b) are RF combined and connected to a single optical fiber which carries the downstream signals to both optical node A 352a and optical node B 352b. Accordingly, each of the cable modems within Group A (360a) and Group B (360b) are able to receive both downstream channel A and downstream channel B.

In order to illustrate how the technique of the present invention may be used to overcome some of the limitations associated with conventional cable network configurations, an example of a video-on-demand application will now be described using the network shown in FIG. 3A. In this example using FIG. 3A, it is assumed that each downstream channel (313a, 313b) is provided sufficient bandwidth for simultaneously broadcasting a plurality of different video streams or other video data. Further, it is assumed that a first user connected to cable modem CM1 (361) is currently receiving a video stream on downstream channel A, and communicating with the CMTS via upstream channel A1, and that a second user connected to cable modem CM2 (362) is currently receiving a video stream on downstream channel B, and communicating with the CMTS via upstream channel B1. In this example, it is further assumed that a third user connected to cable modem CM3 desires to receive a video stream on downstream channel A. However, in this example, there is insufficient bandwidth on downstream channel A to provide cable modem CM3 with the desired video stream.

A preferred solution would be for the CMTS to instruct the cable modem CM3 to switch downstream channels and receive the desired video stream on downstream channel B (assuming that there is sufficient bandwidth on downstream channel B). However, in conventional cable networks this option is not available to the CMTS. One reason why this option is not available in conventional cable networks is that this command is not supported by such systems. Another reason is that, typically there is no synchronization between line cards in a conventional CMTS. Thus, for example, if the CMTS 310 were implemented using conventional techniques, line card A 303a would not be in synchronization with line card B 303b. As a result, cable modem CM3 would not be able to "listen" to the CMTS on downstream channel B and "talk" to the CMTS on upstream channel A1.

However, U.S. patent application Ser. No. 09/490,761 (entitled, "TECHNIQUE FOR SYNCHRONIZING MULTIPLE ACCESS CONTROLLERS AT THE HEAD END OF AN ACCESS NETWORK," and previously incorporated by reference), describes at least one technique for synchronizing multiple line cards within a conventional CMTS. Using the synchronization technique described in U.S. patent application Ser. No. 09/490,761, the CM3 cable modem is be able to "listen" to the CMTS on downstream channel B and "talk" to the CMTS on upstream channel A1. More specifically, the CM3 cable modem would be able to obtain current timestamp data from downstream channel B (associated with line card B), and use this current timestamp data to synchronize itself with line card A in order to "talk" to the CMTS via upstream channel A1.

Utilizing this synchronization technology in conjunction with the technique of the present invention, the CMTS is able to perform traffic load balancing on the HFC network of FIG. 3A, wherein the CMTS may instruct the cable modem CM3 to switch its downstream channel from downstream A 313a to downstream B 313b in order to receive the requested video stream on the downstream channel B. The cable modem CM3 is then able to receive the desired video stream from the CMTS on downstream channel B, and is able to communicate with the CMTS using any one of the upstream A channels 319.

According to a specific embodiment, the CMTS may include software to enable the different line cards within the CMTS to speak to each other. Further, synchronization between the each of the various line cards within the CMTS may be achieved, for example, by designating each MAC controller (e.g. 306a, 308a) as either a master or slave time reference device, or by utilizing additional synchronization circuitry 350, as shown for example, in FIG. 3B of the drawings.

Figure 3B:
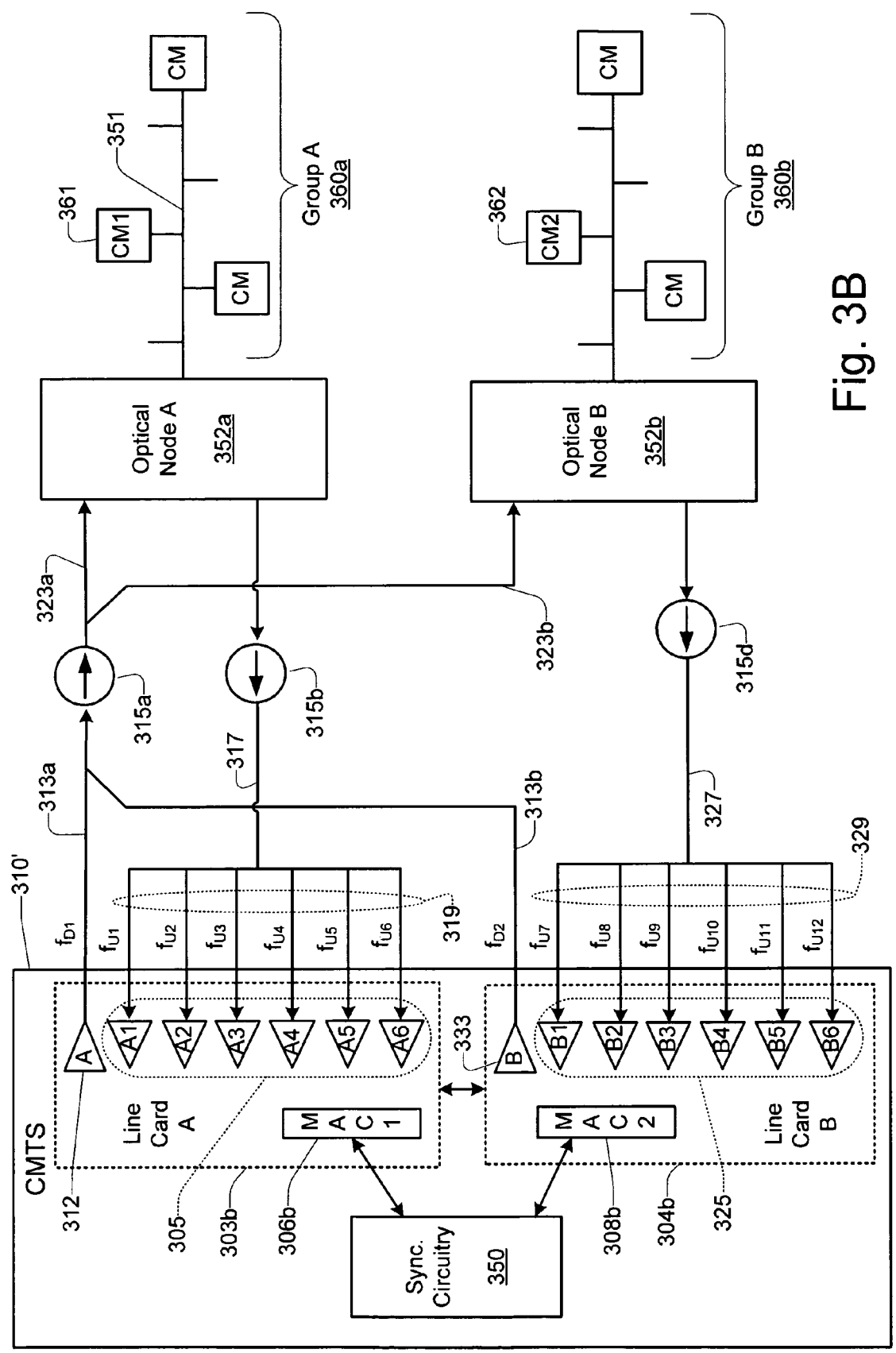
FIG. 3B shows a block diagram of an alternate implementation of a cable network in accordance with a specific embodiment of the present invention.

FIG. 3B shows a block diagram of a cable network in accordance with a specific embodiment of the present invention. As shown in FIG. 3B, a synchronization circuit 350 is included at the Head End of the cable network. The synchronization circuit 350 includes a master time reference device, which, in a specific embodiment, is a timestamp counter referred to as the system timestamp master. The synchronization circuitry 350 may include hardware and/or software which is used to synchronize selected line cards within the CMTS. In a specific embodiment, the synchronization circuitry resides within CMTS 310. However, in an alternate embodiment (not shown), the synchronization circuitry may reside outside the CMTS.

According to at least one embodiment of the present invention, a master time reference device maintains and updates current time reference data, and periodically distributes synchronization signals to each (or a selected portion) of the MAC controllers (e.g., 306, 308) within the CMTS in order to synchronize the time reference devices located in each of the MAC controllers. The synchronization information includes current time reference data generated by the master time reference device. In a specific embodiment, the current time reference data is a timestamp value generated from the master timestamp counter. Each MAC controller receiving the synchronization data is configured to use the current time reference value to synchronize its internal time reference device (e.g., timestamp counter) with the master time reference device. The time reference devices which reside in the MAC controllers may be referred to as slave time reference devices (or slave timestamp counters). By synchronizing each of the slave time reference devices with a master time reference device, each MAC controller within the CMTS may be synchronized with the other MAC controllers within the CMTS, thereby resulting in each of the line cards within the CMTS being in synchronization.

It will be appreciated by one having ordinary skills in the art that other synchronization aspects pertaining to the systems described in this application should preferably be accounted for in order to achieve full system synchronization. Such synchronization aspects are commonly known to those skilled in the art, and include, for example, line delays, clock skew between line cards, etc.

According to a specific embodiment packets sent by any of the cable modems to the CMTS are received at a central location, regardless of the particular upstream channel used. The CMTS includes software and/or hardware for receiving the packets, interpreting the packets, and forwarding the packets. The Head End may also include additional hardware and/or software for managing one or more DOCSIS domains across a plurality of line cards. This additional hardware and/or software allows the CMTS to know specifically how each of the different domains are mapped and grouped. In a specific embodiment, the additional hardware and/or software resides within the CMTS. Alternatively, the additional hardware and/or software may reside outside the CMTS.

Further, according to a specific embodiment, the logic for generating channel MAP messages resides at some central location within the CMTS, and does not reside on the individual line cards. In an alternate embodiment, each line card will include additional hardware and/or software for generating channel MAP messages for the upstream channels associated with that particular line card. In this latter embodiment, additional hardware and/or software may also be included for allowing channel MAP messages generated from a first line card to be broadcast on the downstream channel(s) of a different line card.

Further, according to a specific embodiment, the system clock signal may be derived from a network source or other timing reference external to the network Head End. For example, the clock may be derived from a T1 line connected to the network Head End. Typically, the T1 clock has a frequency of 1.544 MHz. A phase lock loop (PLL) circuit may then be used to convert the T1 clock signal into a desired network clock frequency of 10.42 MHz. Alternatively, the system clock signal may be derived from a Stratum clock source such as, for example, a GPS or SONET clock source.

Figure 5:
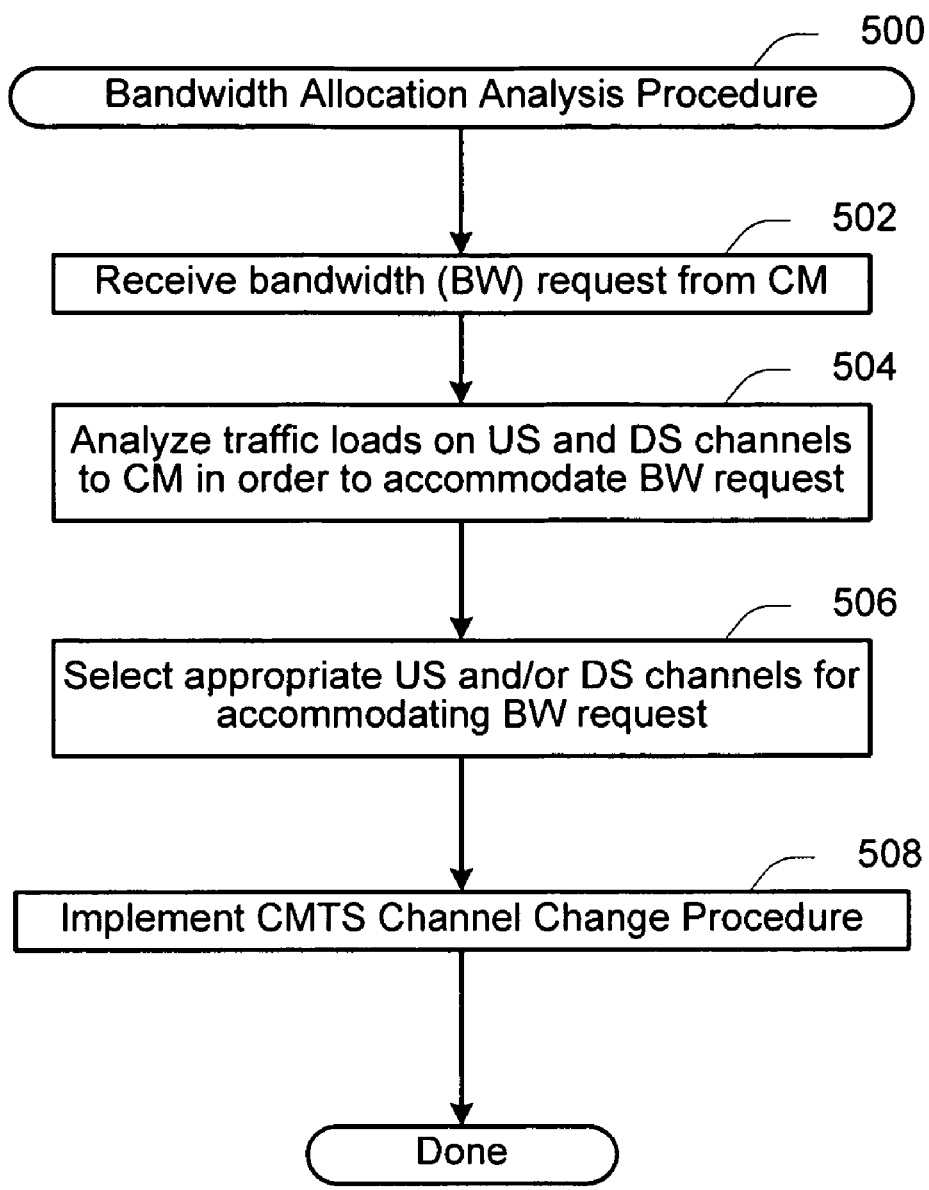
FIG. 5 shows a flow diagram of a Bandwidth Allocation Analysis Procedure 500 in accordance with a specific embodiment of the present invention.

FIG. 5 shows a flow diagram of a Bandwidth Allocation Analysis Procedure 500 in accordance with a specific embodiment on the present invention. According to a specific embodiment, the Bandwidth Allocation Analysis Procedure 500 may be implemented at the CMTS in response to receiving a bandwidth request from one or more cable modems in the network. For purposes of illustration, the Bandwidth Allocation Analysis Procedure of FIG. 5 will now be interpreted with respect to the network topology illustrated in FIG. 3A of the drawings. In this example, it is assumed that cable modem CM1 361 is currently receiving data from the CMTS via downstream channel A 313*a* and transmitting data to the CMTS via upstream channel 319*a*. Further, it is assumed that CM1 has sent a bandwidth request to the CMTS to receive a particular video stream which is currently being broadcast on downstream channel B 313*b*.

Referring to FIG. 5, at 502 the CMTS receives a bandwidth (BW) request from a particular cable modem in the access network (e.g. cable modem CM1 361). Upon receiving a bandwidth request, the CMTS analyzes (504) traffic loads on upstream (US) and downstream (DS) channels to the cable modem CM1 in order to determine the most appropriate channel(s) for accommodating the bandwidth request. Thus, in the example of FIG. 3A, the CMTS analyzes traffic loads on upstream channels 319 and downstream channels 313*a* and 313*b* in the order to determine the most appropriate channels for accommodating the CM1 bandwidth request. At 506 the CMTS determines and selects the appropriate upstream and/or downstream channels for accommodating the CM1 bandwidth request. Thereafter, if the chosen channel is different than either of the channels the cable modem CM1 is connected to, then the CMTS initiates or implements (508) a CMTS channel change procedure such as that shown, for example, in FIG. 6 of the drawings.

Figure 6:
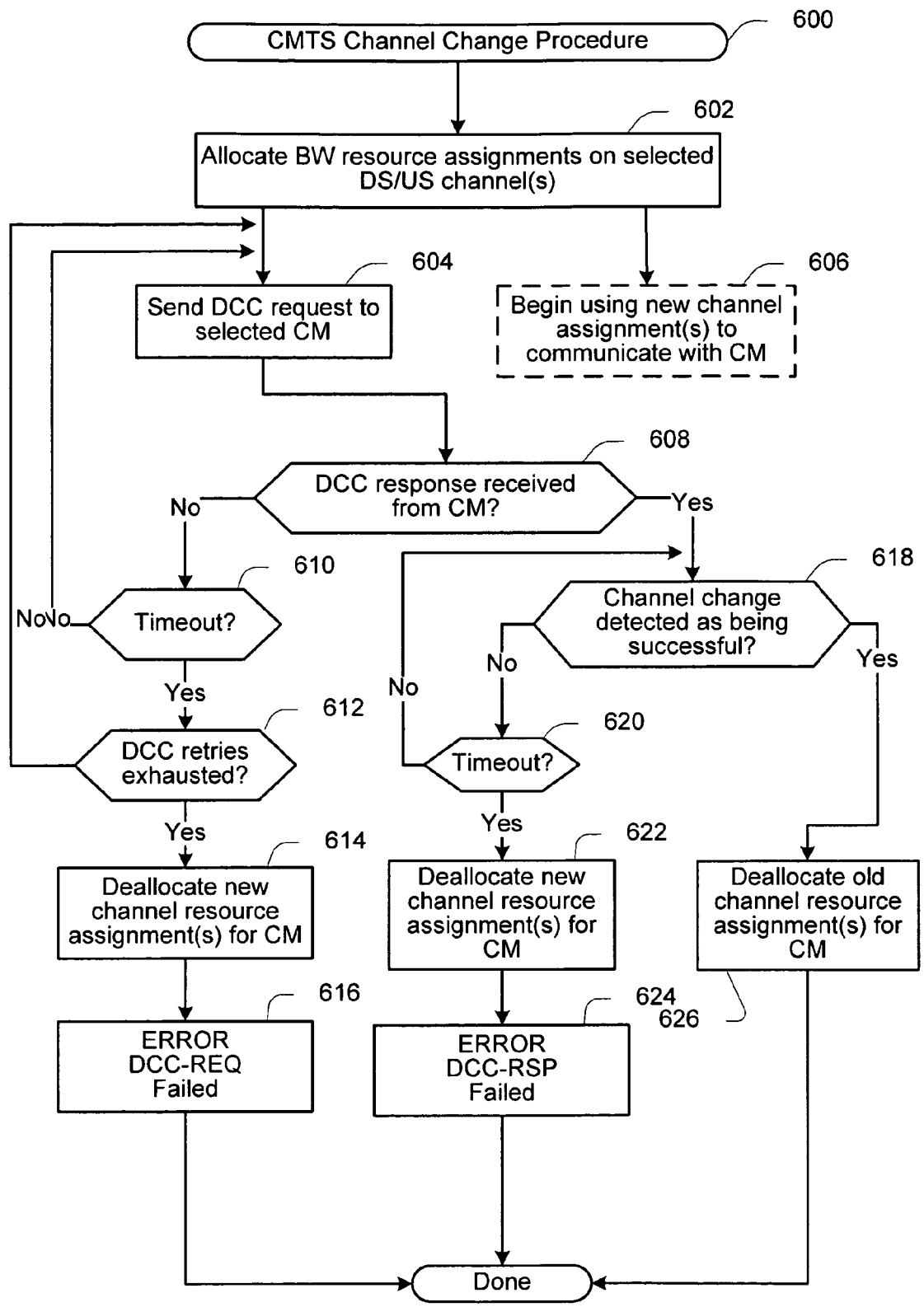
FIG. 6 shows a flow diagram of a CMTS Channel Change Procedure 600 in accordance with a specific embodiment of the present invention.

FIG. 6 shows a flow diagram of a CMTS Channel Change Procedure 600 in accordance with a specific embodiment of the present invention. According to at least one implementation, the CMTS Channel Change Procedure 600 may be implemented or evoked by the CMTS in order to cause one or more selected cable modems to switch their active upstream and/or downstream channels. As stated previously, it is assumed that cable modem CM1 is currently communicating with the CMTS via downstream channel 313*a* and upstream channel 319*a*. At 602 the CMTS allocates bandwidth resource assignments for the CM1 bandwidth request on the newly selected upstream and/or downstream channel(s) which the CMTS selected in the Bandwidth Allocation Analysis Procedure of FIG. 5. In the present example, it is assumed that the CMTS has determined that the CM1 cable modem should switch downstream channels from downstream channel A 313*a* to downstream channel B 313*b*. Thus, at 602 the CMTS will allocate bandwidth resource assignments for cable modem CM1 on downstream channel B 313*b*. Thereafter, according to a specific embodiment, the CMTS may begin using (606) downstream channel B 313*b* to communicate with cable modem CM1. Further, according to at least one embodiment, the CMTS also continues to use downstream channel A 313*a* to communicate with the cable modem, in the event that the CMTS is unable to communicate with the cable modem CM1 using the newly assigned downstream channel B 313*b*.

At 604 the CMTS sends a dynamic channel change (DCC) request to cable modem CM1. In the present example, the DCC request will include a downstream channel change request, which instructs the cable modem to switch from downstream channel A to downstream channel B. The CMTS then waits (608) to receive a DCC response or acknowledgement from the cable modem. If, after a predetermined time interval $T_1$ has elapsed (610), the cable modem CM1 has not provided a DCC response to the CMTS, the CMTS may transmit another DCC request to the cable modem, and again wait to receive the DCC response. The predetermined time interval $T_1$ may range, for example, from several milliseconds to several minutes. According to a specific implementation, the value of $T_1$ is set equal to 300 milliseconds, meaning that the CMTS will transmit a duplicate DCC request to the cable modem CM1 if it does not receive a DCC response from the cable modem within 300 milliseconds from the time that the previous DCC request was transmitted.

As shown at 612, the CMTS may be configured to attempt to re-send the DCC request to the CM1 cable modem a predetermined number of times (e.g. DCC_REQ_RETRY) if it continues to not receive a DCC response from the cable modem. This predetermined number DCC_REQ_RETRY may vary depending upon specific system preferences. According to a specific implementation, the predetermined number DCC_REQ_RETRY may be set equal to the value 3, meaning that the CMTS will re-send the DCC request to the CM1 cable modem up to three times before declaring the DCC request a failure.

If, after the CMTS has exhausted its number of DCC request retries, it has still not received a DCC response from the CM1 cable modem, the CMTS de-allocates (614) the bandwidth resource assignment(s) which the CMTS recently allocated on the newly selected upstream and/or downstream channels for accommodating the CM1 bandwidth request. Thereafter, the CMTS may generate (616) an error message stating that the DCC request to the CM1 cable modem has failed. According to a specific embodiment, this error message, as well as other error messages generated using the technique of the present invention, may be reported to a system administrator, and/or may also be reported to other components within the network for appropriate processing.

Returning to block 608 of FIG. 6, it is now assumed that the CMTS receives a DCC response from the desired cable modem (e.g. CM1). Once the CMTS receives the DCC response from the desired cable modem, the CMTS attempts to determine (618) whether the cable modem CM1 has successfully implemented a DCC procedure in accordance with the DCC request. According to a specific embodiment, the CMTS may determine whether the CM1 cable modem has successfully switched over to the newly designated downstream and/or upstream channel(s) by monitoring activity on the newly designated channel(s). For example, if the CMTS detects that the CM1 cable modem is transmitting and/or receiving data on the newly designated channel(s), it may be assumed that the cable modem has successfully complied with the DCC request. Alternatively, the cable modem may transmit a DCC response to the CMTS via the newly designated channel(s), which indicates that the cable modem is successfully receiving and/or transmitting data on the newly designated channel(s). When the CMTS detects that the cable modem has successfully complied with the DCC request, the CMTS may then de-allocate (626) the bandwidth resource assignment(s) on the old channels which were previously used to communicate with the cable modem.

However, if the CMTS does not detect that the cable modem has successfully switched over to the newly designated upstream and/or downstream channel(s), then the CMTS may wait (620) a predetermined time period $T_5$ in order to allow the cable modem to successfully comply with the DCC request. The value for the predetermined time period $T_5$ may range, for example, from several milliseconds to several minutes. According to a specific implementation, the value $T_5$ may be set equal to one second. Additionally, according to one embodiment, the measurement of the time value $T_5$ may begin after the most recent issue or transmission of a DCC request to the desired cable modem. Alternatively, the measurement of the time value $T_5$ may begin after the CMTS receives a DCC response from the desired cable modem via the old channel(s) (e.g. the channel(s) used by the cable modem to communicate with the CMTS prior to receiving the DCC request). It will be appreciated that, during this time, bandwidth resource assignments may be allocated to the CM1 cable modem on both the newly designated channel(s) and the previous channel(s) being used by the CM1 cable modem.

If, after the time period $T_5$ has elapsed, the CMTS is not able to detect that the CM1 cable modem has successfully complied with the DCC request, the CMTS may de-allocate (622) the bandwidth resource assignments on the newly designated upstream and/or downstream channel(s). Thereafter, the CMTS may report (624) an error specifying a DCC response failure at the CM1 cable modem.

Figure 7:
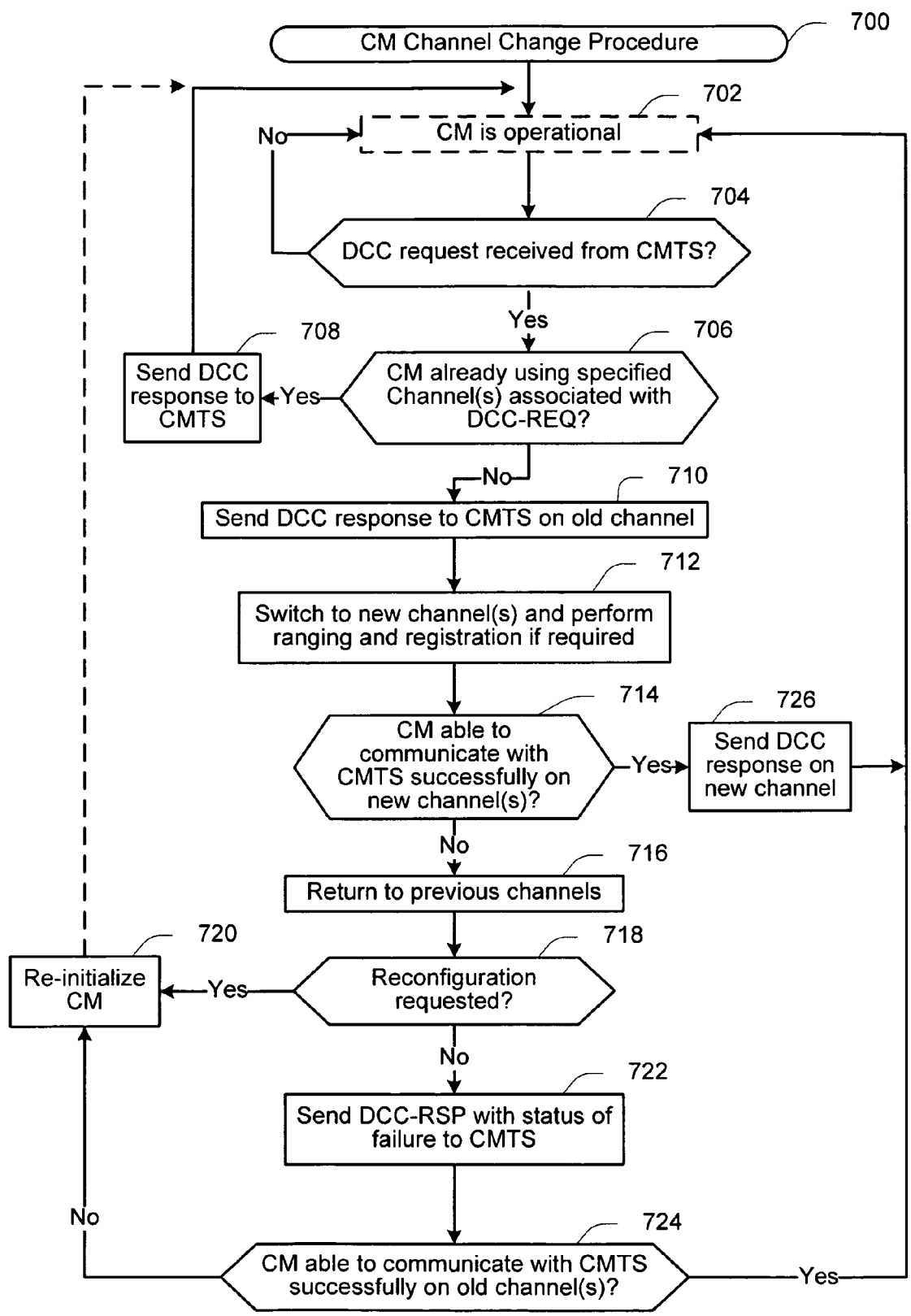
FIG. 7 shows a flow diagram of a Cable Modem Channel Change Procedure 700 in accordance with a specific embodiment of the present invention.

FIG. 7 shows a flow diagram of a Cable Modem Dynamic Channel Change Procedure 700 in accordance with a specific embodiment of the present invention. A separate instance of the Cable Modem Channel Change Procedure 700 may be implemented at each or a portion of the cable modems in the cable network. In the example of FIG. 7, it is assumed that the Cable Modem Channel Change Procedure 700 is implemented at cable modem CM1 361 of FIG. 3A. As shown at 702 of FIG. 7, it is initially assumed that the cable modem CM1 is operational and successfully communicating with the CMTS via a specific upstream channel and a specific downstream channel (referred to as the old channel(s)). At 704 the cable modem determines whether it has received a DCC request from the CMTS. Upon receiving a DCC request, the cable modem determines (706) whether it is already using one or more of the newly designated channels specified in the DCC request. If the cable modem determines that it is already using the channel(s) specified by the DCC request to communicate with the CMTS, the cable modem sends (708) a DCC response to the CMTS. In this way, the CM Channel Change Procedure is able to deal with any lost or dropped DCC response or DCC request messages. For example, if the CM1 cable modem transmits a DCC response which is dropped before reaching the CMTS, the CMTS may re-transmit the DCC request to the CM1 cable modem. When the cable modem receives the subsequent, duplicate DCC request, it recognizes that it is already using the newly designated upstream/downstream channel(s), and transmits a DCC response to the CMTS via the new channel(s).

However, if the cable modem determines that it is not using the newly designated channel(s) specified by the DCC request, the CM transmits (710) a DCC response to the CMTS via the old upstream channel, and attempts to implement a DCC operation in accordance with the DCC request. According to a specific embodiment, the DCC request may include an upstream and/or downstream channel change request. In performing the dynamic channel change operation, the cable modem will attempt to switch (712) over to the newly designated channel(s) specified by the DCC request. Additionally, after switching to the newly designated channel(s), the cable modem may perform any ranging and/or registration procedures, if required. For example, ranging and/or registration procedures may be required, for example, (1) where the newly designated channel(s) correspond to a new DOCSIS domain or a different CMTS line card which is not in synchronization with the old channel(s) that the cable modem was previously using, or (2) where the newly designated channel(s) are not under the control of the CMTS 310.

At 714 the cable modem attempts to determine whether it is able to successfully communicate with the CMTS via the newly designated channel(s). Assuming that the cable modem is able to successfully communicate with the CMTS on the new channel(s), the cable modem may transmit (726) a DCC response to the CMTS via the newly designated channel(s), and then returns to its normal operational state (702). It will be appreciated that, where the DCC request only involves a downstream channel change, the cable modem will continue to transmit DCC responses to the CMTS via the old upstream channel. However, successful transmission of data on the upstream channel is conditional upon successful reception of data on the downstream channel. Thus, if the CM is not able to successfully receive data on the new downstream channel, it will not be able to successfully transmit data on the old upstream channel. Additionally, according to a specific embodiment, different types of DCC responses may be generated by the CM depending on whether the DCC response relates to the CM departing from the old channel or relates to the CM arriving on the new channel.

If the cable modem determines that it is not able to successfully communicate with the CMTS via the newly designated channel(s), the cable modem will return (716) to the old channel(s) which it was using to communicate with the CMTS before receiving the DCC request. If the DCC request included a request for the cable modem to perform reconfiguration when switching over to the newly designated channel(s), then the cable modem will determine (718) that it needs to reinitialize itself in order to communicate with the CMTS on the old channel(s). Accordingly, the cable modem will re-initialize (720) itself.

Assuming, however, that the cable modem was not requested to perform a reconfiguration, at 722 it will attempt to send a DCC response to the CMTS which includes information relating to the status of its failure. At 724, the cable modem attempts to determine whether it is able to successfully communicate with the CMTS using the old channel(s). If the cable modem is able to successfully communicate with the CMTS on the old channel(s), then it may return to its normal operating state. However, if the cable modem is unable to successfully communicate with the CMTS on the old channels, it may then re-initialize (720) itself in order to return to normal operation on the old channel(s).

Figure 4:
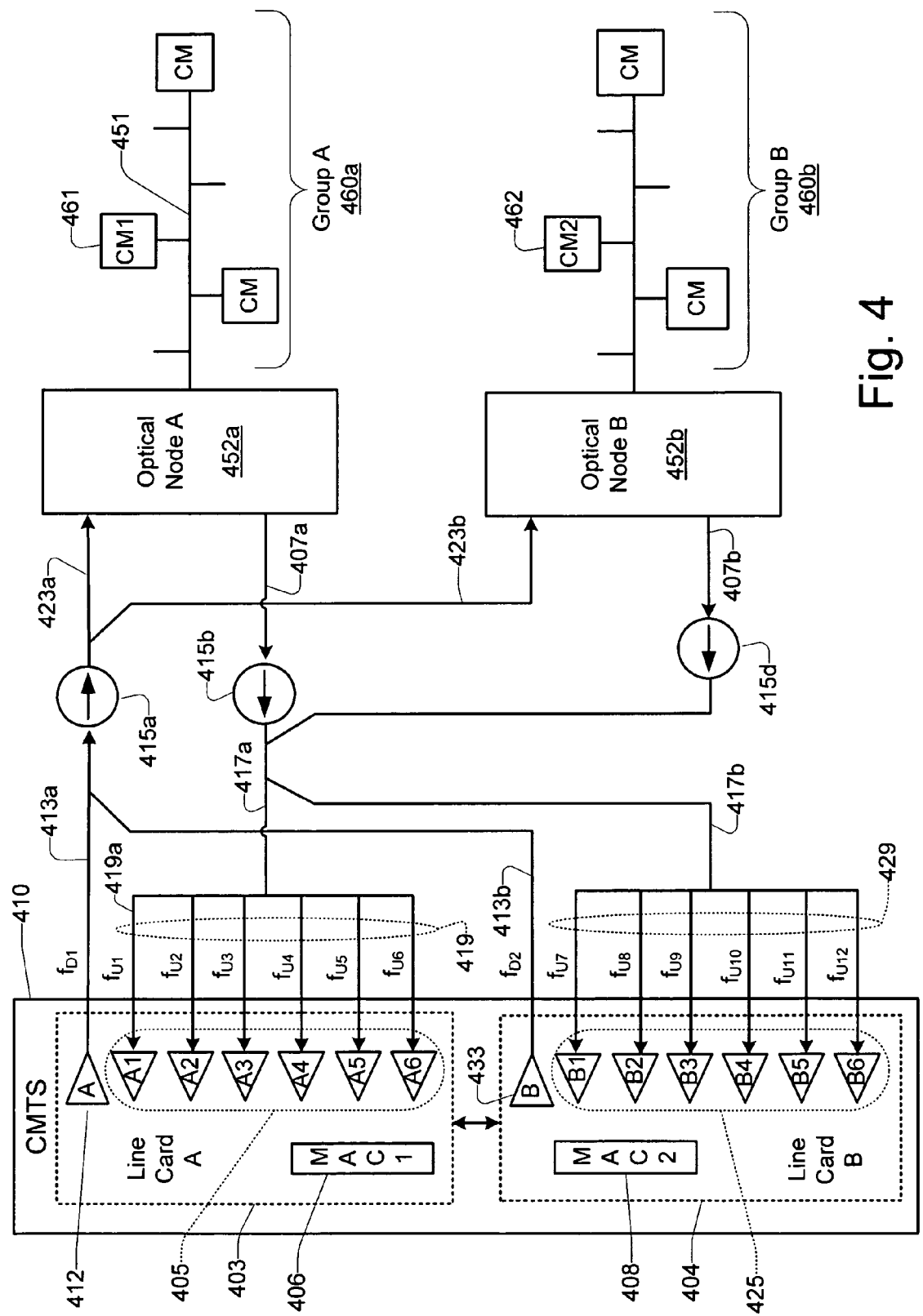
FIG. 4 shows a block diagram of a different implementation of a cable network in accordance with a specific embodiment of the present invention.

FIG. 4 shows a block diagram of a cable network topology in accordance with a specific embodiment of the present invention. The embodiment of FIG. 4 is similar to that of FIG. 3A, with the exception that each optical node (e.g. optical node A 452*a*, optical node B 452*b*) is coupled to both the downstream and upstream channels on each line card within the CMTS 410. Thus, according to this configuration, each cable modem in the network is provided access to each of the upstream and downstream channels associated with line cards A and B. It will be appreciated that the network topology of FIG. 4 may be used to implement dynamic channel change in cable networks which do not have synchronized line cards.

In conventional CMTS configurations, each line card in the system includes a separate MAC controller which is responsible for implementing a DOCSIS MAC protocol between the CMTS and the cable modems serviced by that particular line card. Each MAC controller has its own unique timestamp counter which generates its own local time reference. Thus, each line card in the system operates according to its own local time reference, and is not synchronized with other line cards in the system. Further, each line card in the system periodically distributes a timestamp value of its local time reference to the respective group of cable modems serviced by that line card. For this reason, a first group of cable modems serviced by a first line card will not be in synchronization with a second group of cable modems serviced by a second line card at the CMTS.

In the example of FIG. 4, if it is assumed that line card A 403 is not in synchronization with line card B 404, dynamic channel change may be implemented at a selected cable modem (e.g. CM1 461) by including in the DCC request instructions for the cable modem to switch both its upstream and downstream channels simultaneously. Thus, for example, if cable modem CM1 is initially communicating with the CMTS 410 via downstream channel A 413*a* and upstream channel A1 419*a*, and the CMTS determines that the cable modem CM1 should switch to downstream channel B 413*b*, it will send a DCC request to the cable modem specifying that the cable modem should simultaneously switch both its upstream and downstream channels, where the new downstream channel is downstream channel B 413*b*, and the new upstream channel is one of the upstream channels 429 associated with line card B. If the new channels belong to a different domain, then the cable modem may be required to reconfigure itself and/or reinitialize itself before using the new channels associated with line card B. It will be appreciated that the network topology of FIG. 4 is not necessarily limited to asynchronous line cards. The network topology shown in FIG. 4 may also be used to implement DCC in cable networks which have synchronized line cards and/or MAC controllers.

Further, it will be appreciated that the DCC technique of the present invention may be implemented in cable networks where one or more cable modems have observability of multiple upstream and/or multiple downstream channels. According to a specific embodiment, the technique of the present invention may be applied in cable networks where single MAC controllers control multiple downstream channels, and may also be applied between downstream channels in cable networks which may or may not have synchronized MAC controllers.

One advantage of the technique of the present invention is that it allows different upstream and/or downstream ports on different line cards to be grouped together within the same DOCSIS domain. This, in turn, provides the advantage of allowing greater flexibility in the design of line card interfaces. Furthermore, since different ports on different line card interfaces may be assigned to the same domain, the cable operator or service provider is allowed greater flexibility and scalability in configuring different domains to suit the needs specific applications such as, for example, telephony, video-on-demand, etc. Several of these advantages are illustrated by way of example in the description of FIG. 10.

Figure 10:
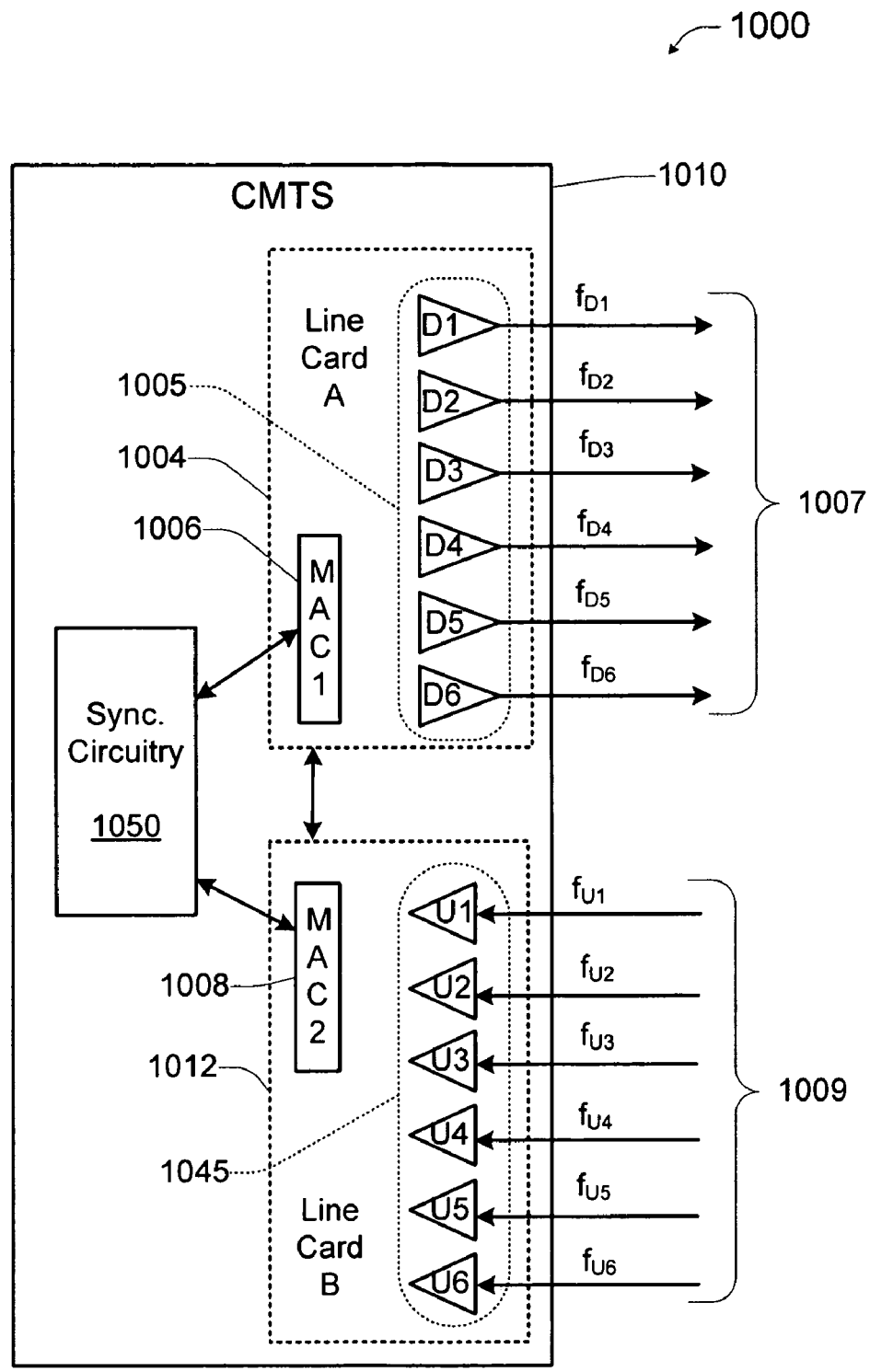
FIG. 10 shows a block diagram of a specific embodiment of a Cable Modem Termination System (CMTS) 1000 which may be implemented using the technique of the present invention.

FIG. 10 shows a block diagram of a specific embodiment of a Cable Modem Termination System (CMTS) 1000 which may be implemented using the technique of the present invention. As shown in FIG. 10, separate upstream and downstream line cards may be provided within the CMTS, which offers greater flexibility and scalability to the cable operator or service provide when configuring particular domains in the network to be optimized for specific applications. Thus, as shown in FIG. 10, a first line card 1004 includes a plurality of downstream channels or downstream transmitters 1005, and a second line card 1012 includes a plurality of upstream receivers 1045. By synchronizing each of the line cards in accordance with the technique of the present invention, it is then possible to dynamically assign (via software) a first group of upstream and downstream channels to a first domain, a second group of upstream and downstream channels to a second domain, and so on. In this way, the service provider is provided with tremendous flexibility in being able to group any combination of upstreams and/or downstreams together within a single domain. As long as the MAP messages, timestamp synchronization messages, and upstream channel descriptors are distributed appropriately, any number of DOCSIS domains may be implemented, wherein each domain includes any desired combination of upstream and downstream channels available at the CMTS. This provides the cable operator or service provider tremendous flexibility when configuring a cable network or other access network to suit specific applications. For example, video-on-demand applications are downstream bandwidth intensive, and therefore the service provided may wish to configure a domain for this application which includes a large number of downstream channels and a relatively few number of upstream channels. However, for voice applications, the service provider may wish to configure the network differently. Since voice applications, such as telephony, for example, use approximately symmetrical bandwidth, it may be preferable to configure a CMTS (or one or more line cards within the CMTS) to include an appropriate ratio of upstream and downstream channels within each domain in order to provide each domain with symmetrical bandwidth.

The present invention provides total flexibility in allowing one to group together any combination of upstream and/or downstream ports across different line cards into a single domain. Additionally, the technique of the present invention provides the added benefit of allowing the user to dynamically modify the number of upstream and/or downstream channels within a particular domain by reassigning selected ports (on one or more different line cards) to different domains. Further, using the technique of the present invention, the cable operator is able to implement such modifications without having to install additional hardware (e.g., line cards) at the CMTS. Additionally, the technique of the present invention provides added flexibility in network implementation by allowing DOCSIS (or MAC) domains to be dynamically configurable via software.

Additionally, the technique of the present invention is particularly useful or advantageous in access networks implementing redundancy protocols. Referring to FIG. 4, for example, it may be assumed that the cable modems of Group A 460a communicate with the CMTS via downstream channel A 413a, and upstream channels 419, and that the cable modems of Group B 460b communicate with the CMTS via downstream channel B 413b, and upstream channels 429. In accordance with the technique of the present invention, if a failure is detected on line card A, for example, the Group A modems are able to be switched over to the upstream/downstream channels associated with line card B.

In addition to providing benefits for redundancy protocols, the technique of the present invention provides for seamless downstream channel change at the cable modem end. In this way the CMTS may perform dynamic traffic load balancing across the HFC network, thereby allowing more bandwidth to be shared among the cable modems. Seamless downstream channel change also provides benefits in facilitating multi-service convergence of voice, video, and high-speed data applications. These issues become increasingly important as streaming media and video streams are multiplexed onto the same data network.

Dynamic Channel Change Request (DCC-REQ)

A Dynamic Channel Change Request (DCC-REQ) may be transmitted by a CMTS to cause a DCC-enabled cable modem (CM) to change the upstream channel on which it is transmitting, the downstream channel on which it is receiving, or both. An example of the format of a DCC-REQ message is shown in FIG. 11A of the drawings.

Figure 11A:
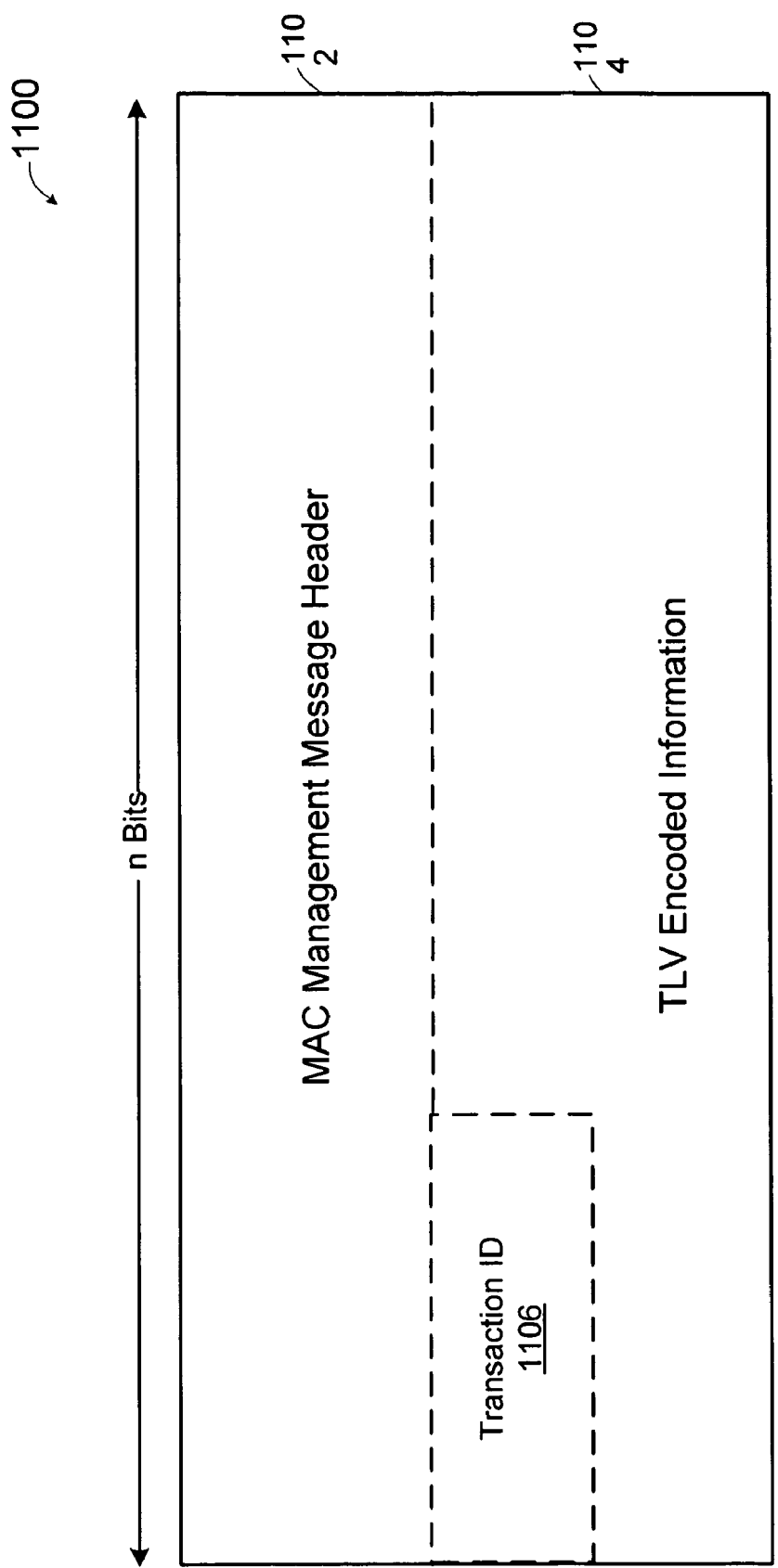
FIG. 11A shows a block diagram of a Dynamic Channel Change Request (DCC-REQ) message in accordance with a specific embodiment of the present invention.

FIG. 11A shows a block diagram of a Dynamic Channel Change Request (DCC-REQ) message in accordance with a specific embodiment of the present invention. As shown in FIG. 11A the DCC-REQ message 1100 may include a MAC management message header portion 1102 and a payload or information portion 1104. The length of the DCC-REQ message may be n bits, where n is a predetermined constant which may vary depending upon network parameters. According to a specific implementation, the value n is set equal to 32 bits. In accordance with at least one embodiment, the DCC-REQ message may include one or more of the following parameters, some of which may be coded, for example, as TLV tuples:

Transaction ID (1106)—an n-bit unique identifier for the DCC transaction assigned by the sender. The value for n may vary, depending upon system design constraints. According to a specific implementation, the value n may be set equal to n=16 bits. Additionally, according to a specific implementation, the Transaction ID is not encoded as a TLV tuple.

Upstream Channel ID—the identifier of the upstream channel to which the CM is to switch for upstream transmissions. When present, this TLV specifies the new upstream channel ID that the CM may use when performing a Dynamic Channel Change. The CMTS may ensure that the Upstream Channel ID for the new channel is different than the Upstream Channel ID for the old channel. This TLV may be included if the upstream channel is changed, even if the Upstream Channel Descriptor (UCD) substitution TLV is included.

Downstream Parameters—when present, this TLV specifies the operating parameters of the new downstream channel, including, for example, the frequency of the downstream channel to which the CM is to switch for downstream reception, downstream channel identifier, modulation type, symbol rate, interleaver depth, etc. According to a specific embodiment the downstream frequency value represents the center frequency of the downstream channel in Hz. Additionally, the downstream channel identifier TLV specifies the downstream channel identifier of the new downstream channel. The CMTS may ensure that the Downstream Channel ID for the new channel is different than the Downstream Channel ID for the old channel.

Initialization Technique—provides directions for the type of initialization, if any, that the CM may perform once synchronized to the new channel(s). When present, this TLV allows the CMTS to direct the CM as to what level of re-initialization, if any, it may perform before it can commence communications on the new channel(s). The CMTS can make this decision based upon its knowledge of the differences between the old and new MAC domains and the PHY characteristics of their upstream and downstream channels. Typically, if the move is between upstream and/or downstream channels within the same MAC domain, then the connection profile values may be left intact. If the move is between different MAC domains, then a complete initialization may be performed. If a complete re-initialization is not required, some re-ranging may still be required. For example, areas of upstream spectrum are often configured in groups. A DCC-REQ to an adjacent upstream channel within a group may not warrant re-ranging. Alternatively, a DCC-REQ to a non-adjacent upstream channel might require station maintenance whereas a DCC-REQ from one upstream channel group to another might require initial maintenance. Re-ranging may also be required if there is any difference in the physical layer parameters between the old and new channels. According to a specific embodiment the re-initialization process implemented by the CM may include, for example, obtaining a UCD, ranging, establishing IP connectivity, establishing time of day, transfer of operational parameters, registration, baseline privacy initialization, etc. In at least one implementation, if a CM performs a channel change without performing a re-initialization, then all the configuration variables of the CM may remain constant, with the exception of the configuration variables which may be changed. According to a specific implementation, the CM may not be aware of any configuration changes other than the ones that have been supplied in the DCC command. In this situation, includency in provisioning between the old and new channels is preferable.

UCD Substitution—provides a copy of the Upstream Channel Descriptor (UCD) for the new channel. According to a specific embodiment, this TLV may occur once and include one UCD. When present, this TLV allows the CMTS to send an Upstream Channel Descriptor message to the CM. This UCD message is intended to be associated with the new upstream and/or downstream channel(s). The CM may store this UCD messages in its cache, and use it after synchronizing to the new channel(s). The CMTS may ensure that the change count in the UCD matches the change count in the UCDs of the new channel(s). According to a specific embodiment, if the CM has to wait for a new UCD message when changing channels, then the DCC operation may be suspended for a predetermined time interval, or longer if the UCD message is lost.

SYNC Substitution—when present, this TLV allows the CMTS to inform the CM to wait or not wait for a SYNC message before proceeding with the DCC operation. The CMTS may have synchronized timestamps between the old and new channel(s) if it instructs the CM to not wait for a SYNC message before transmitting on the new channel. Synchronized timestamps implies that the timestamps are derived from the same clock and include the same value. If the SYNC Substitution TLV is absent, the CM may wait for a SYNC message on the new channel before proceeding. If the CM has to wait for a new SYNC message when changing channels, then operation may be suspended for a predetermined time interval, or longer if the SYNC message is lost or is not synchronized with the old channel(s). An alternative approach is to send SYNC messages more frequently (every 10 ms for example), and continue to require the CM to wait for a SYNC message before proceeding. This approach may result in slightly more latency, but provides an additional check to prevent the CM from transmitting at an incorrect time interval.

SAID Substitution—a pair of Security Association Identifiers (SAID) which include the current SAID and the new SAID for the new channel. According to a specific embodiment, this TLV may occur once if the SAID requires substitution. When present, this TLV allows the CMTS to replace the Security Association Identifier (SAID) in the current Service Flow with a new Security Association Identifier. The baseline privacy keys associated with the SAID may remain the same. According to a specific embodiment, the CM does not have to simultaneously respond to the old and new SAID.

Service Flow Substitution—a group of sub-TLVs which allows substitution in a Service Flow of the Service Flow Identifier, Service Identifier, Classifier Identifier, and/or the Payload Header Suppression Index. According to a specific embodiment this TLV may be repeated for every Service Flow which has parameters requiring substitution. When present, this TLV allows the CMTS to replace specific parameters within the current Service Flows on the current channel assignment with new parameters for the new channel assignment. According to a specific embodiment, a separate Service Flow Substitution TLV is used for each Service Flow that requires changes in parameters. The CMTS may choose to do this to help facilitate setting up new Quality of Service (QoS) reservations on the new channel before deleting QoS reservations on the old channel. According to a specific implementation, the CM does not have to simultaneously respond to the old and new Service Flows. The Service Flow Substitution TLV allows resource assignments and services to be moved between two independent ID value spaces and/or scheduling entities by changing the associated IDs and indexes. ID value spaces that may differ between the two channels include, for example, the Service Flow Identifier, the Service ID, the Classifier Identifier, the Payload Header Suppression Index, etc.

Unsolicited Grant Time Reference Substitution—when present, this TLV allows the CMTS to replace the current Unsolicited Grant Time Reference with a new Unsolicited Grant Time Reference. This TLV is useful if the old and new upstream use different time bases for their time stamps. This TLV is also useful if the Unsolicited Grant transmission window is moved to a different point in time. However, changing this value may cause operation to temporarily exceed the specified jitter window.

If privacy is enabled, a DCC-REQ may also include a HMAC-Digest attrubute. According to a specific embodiment the HMAC-Digest attribute is a keyed message digest (to authenticate the sender). The HMAC-Digest attribute may be the final attribute in the Dynamic Channel Change message's attribute list.

Dynamic Channel Change Response (DCC-RSP)

Each cable modem of the cable network may be configured to support Dynamic Channel Change. If a CM supports Dynamic Channel Change, a Dynamic Channel Change Response (DCC-RSP) may be transmitted by the CM to the CMTS in response to a received DCC-REQ message to indicate that it has received and is complying with the DCC-REQ. An example of the format of a DCC-RSP message is shown in FIG. 11B of the drawings, described in greater detail below.

Before the CM begins to switch to a new upstream or downstream channel, the CM may transmit a DCC-RSP on its current or active upstream channel. When a CM receives a DCC-REQ message requesting that it switch to an upstream and/or downstream channel that it is already using, the CM may respond with a DCC-RSP message on that channel indicating that it is already using the correct channel. According to a specific embodiment, a CM may ignore a DCC-REQ message while it is in the process of performing a channel change. After switching to a new channel, if the Media Access Controller of the CM was not re-initialized, the CM may send a DCC-RSP message to the CMTS.

Figure 11B:
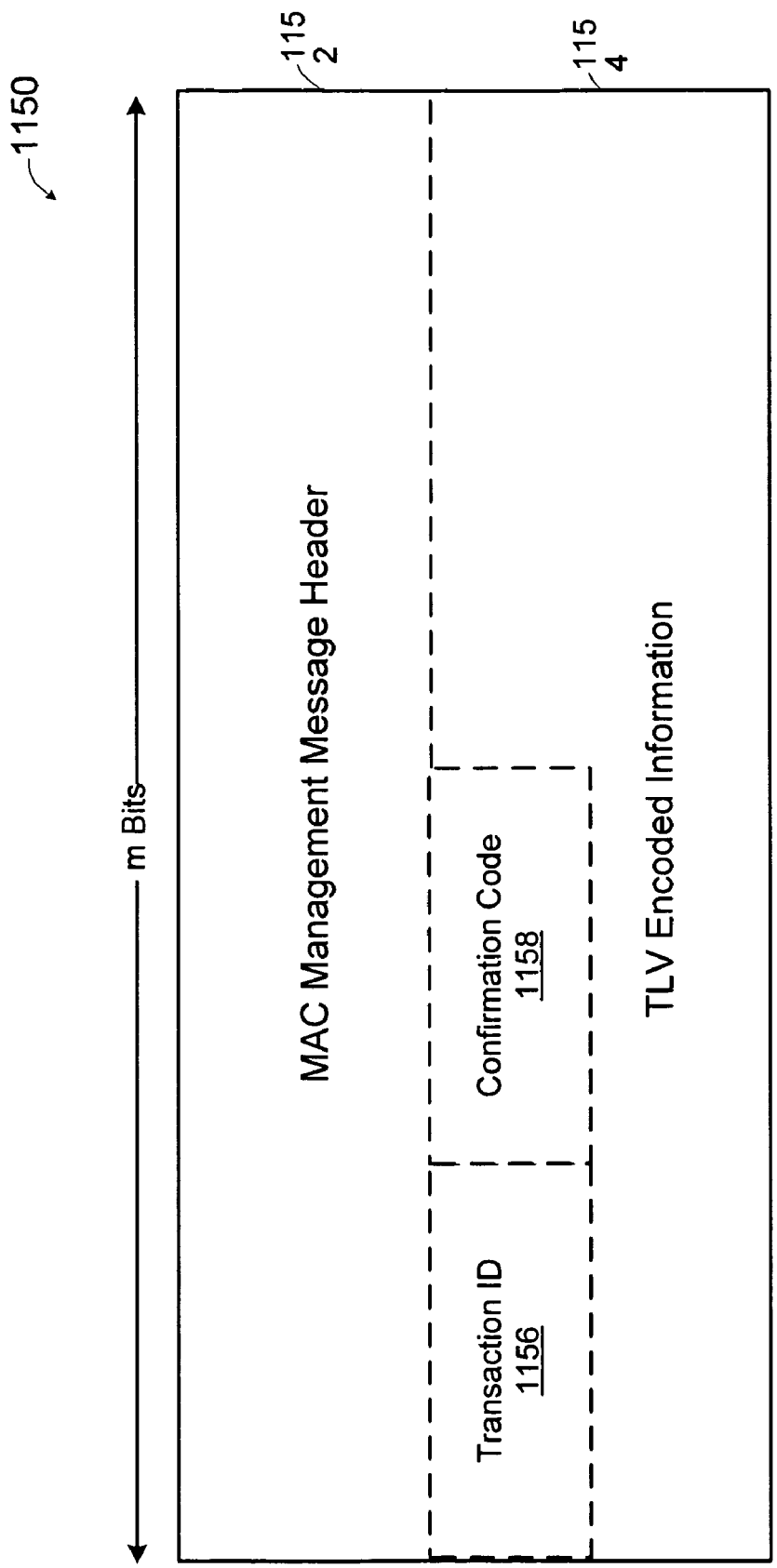
FIG. 11B shows a block diagram of a Dynamic Channel Change Response (DCC-RSP) message in accordance with a specific embodiment of the present invention.

FIG. 11B shows a block diagram of a Dynamic Channel Change Response (DCC-RSP) message in accordance with a specific embodiment of the present invention. As shown in FIG. 11B the DCC-RSP message 1150 may include a MAC management message header portion 1152 and a payload or information portion 1154. The length of the DCC-RSP message may be m bits, where m is a predetermined constant which may vary depending upon network parameters. According to a specific implementation, the value m is set equal to 32 bits. In accordance with at least one embodiment, the DCC-RSP message may include one or more of the following parameters, some of which may be coded, for example, as TLV tuples:

Transaction ID (1156)—a Transaction ID derived from a corresponding DCC-REQ message. According to a specific implementation, the Transaction ID is not encoded as a TLV tuple.

Confirmation Code (1158)—a Confirmation Code relating to the DCC-REQ. According to a specific implementation, the Confirmation Code is not encoded as a TLV tuple.

HMAC-Digest—the HMAC-Digest Attribute is a keyed message digest which may be used, for example, to authenticate the sender.

CM Jump Time—timing parameters describing when the CM may make the jump. When present, this TLV allows the CM to indicate to the CMTS when the CM plans to perform its jump and be disconnected from the network. With this information, the CMTS may take preventative measures to minimize or to eliminate packet drops in the downstream due to the channel change. According to a specific embodiment, the CM Jump Time parameters may include, for example:

Length of Jump—this TLV indicates to the CMTS the length of the jump from the previous channel to the new channel. Specifically, it represents the length of time that the CM may not be able to receive data in the downstream.

Start Time of Jump—when present, this TLV indicates to the CMTS the time in the future that the CM is planning on making the jump. If the value of the start time is less than the current timestamp, the CMTS may assume one roll-over of the timestamp counter has elapsed. The accuracy of the start time is an absolute amount of time before and after the start time. The potential jump window is from (start time−accuracy) to (start time+accuracy+length).

Dynamic Channel Change—Acknowledge (DCC-ACK)

A Dynamic Channel Change Acknowledge (DCC-ACK) may be transmitted by a CMTS in response to a received Dynamic Channel Change Response message on the new channel with its Confirmation Code set to arrive. The format of a DCC-ACK message may be similar to the format of the DCC-REQ shown, for example, in FIG. 11A of the drawings. Thus, for example, the DCC-ACK message may include a MAC management message header portion and a payload or information portion. The DCC-ACK message may also include one or more of the following parameters, some of which may be encoded as TLV tuples:

Transaction ID—a Transaction ID derived from a corresponding DCC-RSP.

HMAC-Digest—a keyed message digest used, for example, to authenticate the sender.

DCC General Operation

At any time after registration, the CMTS may direct the CM to change its downstream and/or upstream channel. This may be done for a variety of reasons, such as, for example, traffic balancing, noise avoidance, etc. The DCC command can be used to change only the upstream frequency, only the downstream frequency, or both the upstream and downstream frequencies. When only the upstream or only the downstream frequency is changed, the change is typically within a MAC domain. When both the upstream and downstream frequencies are changed, the change may be within a MAC domain, or between MAC domains. The Downstream Channel ID and the Upstream Channel ID may both be unique between the old and new channels. In this context, the "old" channel(s) refer to the channel(s) that the CM was using to communicate with the CMTS before the jump, and the "new" channel(s) refer to the channel(s) that the CM will use to communicate with the CMTS after the jump.

Upon synchronizing with the new upstream and/or downstream channel, the CM may use the technique specified in the DCC-REQ Initialization Technique TLV, if present, to determine if it may perform re-initialization, only ranging, or neither. If this TLV is not present in DCC-REQ, the CM may re-initialize its MAC on the new channel assignment. According to a specific embodiment, if the CM has been instructed to re-initialize, then the CMTS will not wait for a DCC-RSP to occur on the new channel. If the CM is being moved within a MAC domain, then a re-initialization may not be required. Alternatively, if the CM is being moved between MAC domains, then a re-initialization may be required. Re-initializing, if requested, is done with the new upstream and channel assignments. It includes obtaining upstream parameters, establish IP connectivity, establish time of day, transfer operational parameters, register, and initialize baseline privacy. According to a specific embodiment, if re-initialization is performed, the CM will not send a DCC-RSP on the new channel.

The decision to re-range is based upon the CMTS's knowledge of any path diversity that may exist between the old and new channels, or if any of the fundamental parameters of the upstream or downstream channel such as symbol rate, modulation type, or minislot size have changed. When DCC-REQ does not involve re-initialization or re-ranging, the design goal of the CM may typically be to minimize the disruption of traffic to the end user. To achieve this goal, a CM may choose to continue to use QoS resources (such as bandwidth grants) on its current channel after receiving a DCC-REQ and before actually executing the channel change. The CM might also need this time to flush internal queues or reset state machines prior to changing channels.

The CM may continue to use QoS resources on the old channel, including the transmission and reception of packets, after sending a DCC-RSP (depart) message and prior to the actual jump. The CM may also use QoS resources on the new channel, including the transmission and reception of packets, after the jump and prior to sending a DCC-RSP (arrive) message. According to a specific implementation, the CMTS will not wait for a DCC-RSP (arrive) message on the new channel before allowing QoS resources to be used. This provision allows the Unsolicited Grant Service (USG) to be used on the old and new channel with a minimum amount of disruption when changing channels.

The CMTS may hold the QoS resources on the current channel until a predetermined time interval $T_3$ has elapsed, or until it can internally confirm the presence of the CM on the new channel assignment. According to a specific embodiment, the value $T_3$ represents the maximum holding time for QoS resources for a DCC procedure, and may range, for example, from several milliseconds to several minutes. According to a specific implementation, the value $T_3$ may be set equal to one second, as measured from the time that the last DCC-REQ was sent. According to a specific embodiment, the CM may execute the departure from the old channel and the arrival at the new channel, less any commanded re-initialization, before the expiry of $T_3$. Additionally, the CM may continue to use QoS resources on the current channel after responding with DCC-RSP and before the expiry of $T_3$.

According to a specific embodiment, once the CM changes channels, all previous outstanding bandwidth requests made via the Request Information Element (IE) or Request/Data IE are invalidated, and the CM may re-request bandwidth on the new channel. Further, in the case of Unsolicited Grant Service in the upstream, the grants may be implicit with the QoS reservations, and therefore do not need to be re-requested.

According to at least one embodiment, if a CM issues a bandwidth request for more resources, and the CMTS needs to do a DCC to obtain those resources, the CMTS may reject the bandwidth request command without allocating any resources to the CM. The CMTS may include a confirmation code of "reject-temporary" in the response message to the bandwidth request to indicate that the new resources may not be available until a DCC is received. The CMTS may then follow the bandwidth request response transaction with a DCC transaction. After the CM jumps to a new channel and completes the DCC transaction, the CM may retry the bandwidth request command. According to DOCSIS, bandwidth requests from the CM may include, for example, a Dynamic Service Add (DSA) requests, a Dynamic Service Change (DSC) requests, etc.

If the CM has not changed channels after a predetermined time interval $T_4$ has elapsed (as measured, for example, from the time that the CM received DSA-RSP or DSC-RSP from the CMTS) then the CM may retry the resource request. The value of $T_4$ may range from several milliseconds to several minutes. According to a specific implementation, the value of $T_4$ may be set equal to a minimum value of 2 seconds.

If the CMTS needs to change channels in order to satisfy a resource request other than a CM initiated DSA or DSC command, then the CMTS may execute the DCC command first, and then issue a DSA or DSC command. However, if a CMTS issues a DCC with re-initialize, the CM configuration file could cause the CM to come back to the original channel. This scenario may result in an infinite loop. One technique for preventing this situation is to not allow the CMTS to issue a DCC-REQ with the re-initialize option.

According to a specific embodiment, if the CMTS issues a DCC-REQ command and the CM simultaneously issues a DSA-REQ or DSC-REQ then the CMTS command takes priority. The CMTS then responds with a confirmation code of "reject-temporary", and the CM proceeds with executing the DCC command If the CM is unable to achieve communications with a CMTS on the new channel(s), it may return to the previous channel(s) and re-initialize its MAC. The previous channel assignment represents a known good operating point which may speed up the re-initialization process. Also, returning to the previous channel provides a more robust operational environment for the CMTS to find a CM that fails to connect on the new channel(s).

Additionally, according to a specific embodiment, if the CM receives a DCC-REQ with the Upstream Channel ID TLV (if present) equal to the current Upstream Channel ID, and the Downstream Frequency TLV (if present) is equal to the current downstream frequency, then the CM may consider the DCC-REQ as a redundant command, and the remaining DCC-REQ TLV parameters do not have to be executed. The CM may then return a DCC-RSP, with a confirmation code of "reject-already-there", to the CMTS.

When the CMTS wishes to add new QoS reservations to a CM, it may be necessary to move that CM to a new upstream and/or downsteam to achieve that goal. During that changing of channels, it is desirable to provide the minimum of interruption to existing QoS services such as voice over IP or video streaming sessions. This near-seamless channel change is an important design goal of the DCC command. The CMTS may support a near-seamless channel change. The CM may support a near-seamless channel change. The actions below are recommended operating procedures to implement a near-seamless channel change in accordance with a specific embodiment of the present invention. It will be appreciated that these suggestions are based on the assumption that both the upstream and downstream channels are changing. A subset of the list would apply if only the upstream or downstream channel changed.

To achieve a near-seamless channel change, the CMTS:
may duplicate all the relevant QoS reservations for the CM on the old and new channel assignments before initiating a DCC-REQ.
may duplicate downstream packet flow for the CM on the old and new channel assignments before initiating a DCC-REQ (for downstream channel changes).
may transmit MAP messages for the new upstream channel on the old downstream channel for at least the duration of $T_3$, assuming that the old and new downstream channels share the same timestamp.
may specify the downstream and upstream parameters of the new channels prior to the CM jumping.
may specify to not wait for a SYNC message on the new channel.
may specify to skip initialization.
may specify to skip initial maintenance and station maintenance.
may manage service flow substitutions between old and new SIDs, SAID, Service Flow IDs, Classifier IDs, Payload Header Suppression Indexes, and Unsolicited Grant Time Reference as required. Service Class Names may remain the same between the old and new channel(s).
To achieve a near-seamless channel change, the CM:
may reply with estimates for CM Jump Time in the DCC-RSP message.
may listen for and cache MAP messages on the old downstream that apply to the new upstream (e.g., this may be done during time $T_3$).
may use the downstream parameters and the UCD in its cache from the DCC command to force a quicker physical layer convergence when jumping.
may NOT wait for a SYNC message after physical layer convergence and before transmitting, if the CMTS permits the CM to do so.
may use the cached MAPS, if available, to allow a quicker start-up time.
may minimize the disruption of traffic in either direction by allowing traffic to continue to flow in both directions up to the moment prior to the jump and then immediately after resynchronization to the new channel(s) has happened.
may queue incoming data packets that arrive during the jump, and transmit them after the jump.
may discard VoIP packets after the jump that have caused the upstream Unsolicited Grant Service queue to exceed its limit, but no more than necessary.

It will be appreciated that applications that are running over the DOCSIS path may be configured or designed to cope with the loss of packets that may occur during the time that the CM changes channels.

Example Operation

Figure 12:
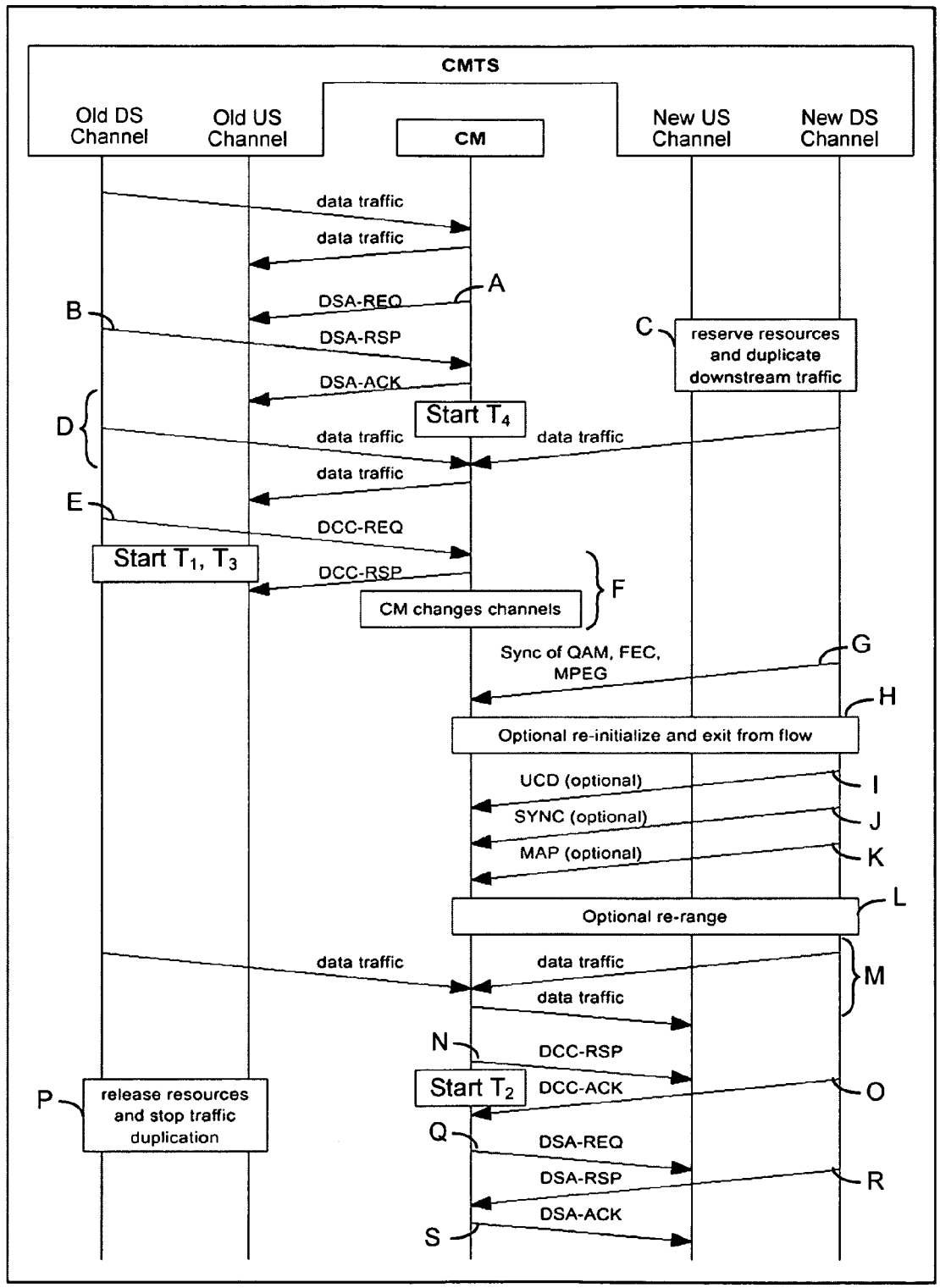
FIG. 12 show an example of a data flow diagram illustrating how the technique of the present invention may be implemented in a cable network.

The Dynamic Channel Change technique of the present invention will now be illustrated by way of example, with reference to FIG. 12 of the drawings and Table 1 (below). The following example describes a scenario where the CM attempts to allocate new resources by transmitting a bandwidth request to the CMTS. The CMTS temporarily rejects the request, tells the CM to change channels, and then the CM re-requests the resources. This example (not including all exception conditions) is described below, and illustrated in FIG. 12:

A) An event occurs, such as the CM issuing a bandwidth request message to the CMTS.

B) The CMTS decides that it needs to change channels in order to service this resource request. The CMTS responds with a bandwidth request response message which includes a confirmation code of "reject-temporary-DCC" in the response to indicate that the new resources are not available until a DCC is received. The CMTS now rejects any further bandwidth request message or DSC messages until the DCC command is executed.

C) The CMTS initiates QoS reservations on the new upstream and/or downstream channels. The QoS reservations include the new resource assignment along with all the current resource assignments assigned to the CM. In this example, both the upstream and downstream channels are changed.

D) To facilitate a near-seamless channel change, since the CMTS is not sure exactly when the CM may switch channels, the CMTS duplicates the downstream packet flow on the old and new downstream channels.

E) The CMTS issues a DCC-REQ command to the CM. If the CMTS does not receive a DCC-RSP within time $T_1$ (see, e.g., Table 1) it may retransmit the DCC-REQ up to a maximum of "DCC-REQ Retries" (see, e.g., Table 1) before declaring the transaction a failure. Note that if the DCC-RSP was lost in transit and the CMTS retries the DCC-REQ, the CM may have already changed downstream channels.

F) The CM sends a DCC-RSP message (with a confirmation code indicating that it is about to depart from the old channels) to the CMTS. The CM then cleans up its queues and state machines as appropriate and changes channels.

G) If there was a downstream channel change, the CM synchronizes to the QAM symbol timing, synchronizes the FEC framing, and synchronizes with the MPEG framing.

H) If the CM has been instructed to re-initialization, it does so with the new upstream and/or downstream channel assignment. The CM exits from the flow of events described here, and enters a different flow of events relating to cable modem initialization (described in detail in the DOCSIS specification).

I) The CM searches for a UCD message unless it has been supplied with a copy.

J) The CM waits for a downstream SYNC message unless it has been instructed not to wait for one.

K) The CM collects MAP messages unless it already has them available in its cache.

L) The CM performs initial maintenance and station maintenance unless it has been instructed to skip them.

M) The CM resumes normal data transmission with its new resource assignment.

N) The CM sends a DCC-RSP message (with a confirmation code indicating its arrival on the new channels) to the CMTS. If the CM sends a DCC-RSP on the new channel and does not receive a DCC-ACK from the CMTS within time $T_2$, it may retry the DCC-RSP up to a maximum of "DCC-ACK Retries" (see, e.g. Table 1).

O) The CMTS responds with a DCC-ACK.

P) The CMTS removes the QoS reservations from the old channels. If the downstream packet flow was duplicated, the packet duplication would also be removed on the old downstream channel.

Q) The CM re-issues its bandwidth request message on the new upstream channel.

R) The CMTS reserves the requested resources and responds with a bandwidth request response message.

S) The CM finishes by transmitting a bandwidth request ACK message.

TABLE 1

| System | Name | Time Reference | Example Value |
|---|---|---|---|
| CMTS | $T_1$ | Wait for a DCC Response on the old channel | 300 ms (Max) |
| CM | $T_2$ | Wait for a DCC Acknowledge | 300 ms (Max) |
| CMTS | $T_3$ | Maximum holding time for QOS resources for DCC | 1 sec (Max) |
| CM | $T_4$ | Minimum time after a DSx reject-temp-DCC and the next retry of DSx command | 2 sec (Min) |
| CMTS | DCC-REQ Retries | Number of retries on Dynamic Channel Change Request | 3 |
| CM | DCC-RSP Retries | Number of retries on Dynamic Channel Change Response | 3 |

CMTS Configurations

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the methods of the present invention are implemented in software such as an operating system or in an application running on an operating system.

A software or software/hardware hybrid system of this invention is preferably implemented on a general-purpose programmable machine selectively activated or reconfigured by a computer program stored in memory. Such a programmable machine may be a network device designed to handle network traffic. Such network devices typically have multiple network interfaces. One important class of device that may be used to implement the present invention is the Cable Modem Termination System. Preferably, the CMTS is a "routing" CMTS, which handles at least some routing functions. Alternatively, the CMTS may be a "bridging" CMTS, which handles only lower-level tasks.

Figure 8:
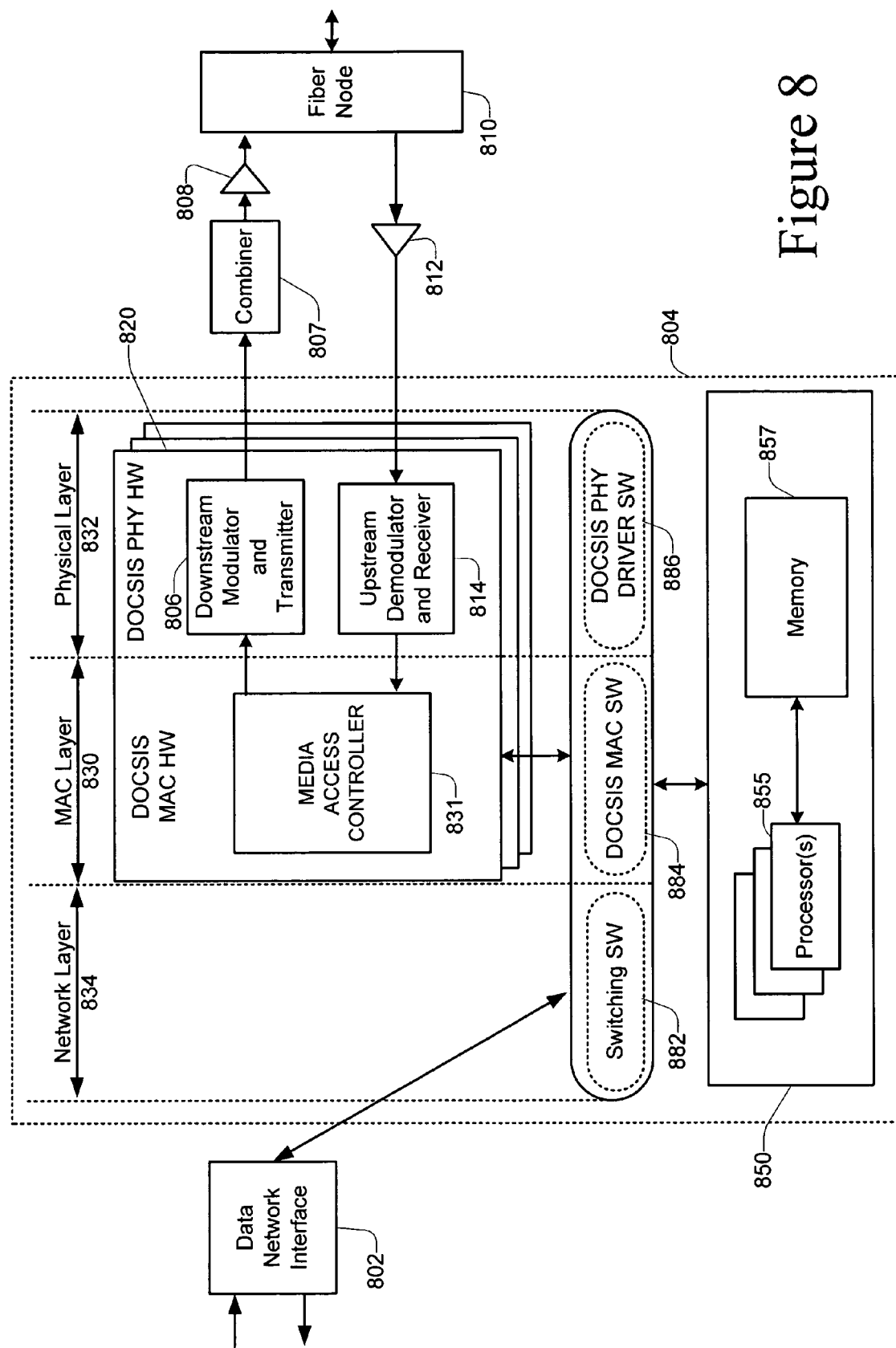
FIG. 8 shows a block diagram of a Cable Modem Termination System (CMTS) which may be used for implementing the technique of the present invention.

FIG. 8 provides an example of some components of a CMTS that may be used to implement certain aspects of this invention. In the specific embodiment as shown in FIG. 8, a CMTS 804 provides functions on three network layers including a physical layer 832, a Media Access Control (MAC) layer 830, and a network layer 834. Generally, the physical layer is responsible for receiving and transmitting RF signals on the cable plant. Hardware portions of the physical layer include a downstream modulator and transmitter 806 and an upstream demodulator and receiver 814. The physical layer also includes software 886 for driving the hardware components of the physical layer.

Upstream optical data signals (packets) arriving via an optical fiber node 810 are converted to electrical signals by a receiver 812. Next, the upstream information packet (RF electrical signals) is demodulated by the demodulator/receiver 814 and then passed to MAC layer block 830. A primary purpose of MAC layer 830 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. The MAC headers include addresses to specific modems or to the CMTS (if sent upstream) by a MAC layer block 830 in CMTS 804. Note that the cable modems also include MAC addressing components. In the cable modems, these components encapsulate upstream data with a header containing the MAC address of the CMTS.

MAC layer block 830 includes a MAC hardware portion (e.g. MAC controller) 831 and a MAC software portion 884, which together serve the above-described functions. In a preferred embodiment, MAC hardware portion 831 is distinct from the router's general-purpose microprocessor and is dedicated to performing some MAC layer functions.

In specific CMTS configurations, the hardware portions of the physical layer 832 and MAC layer 830 reside on a physical line card 820 within the CMTS. The CMTS may include a plurality of distinct line cards which service particular cable modems in the network. Each line card may be configured to have its own unique hardware portions of the physical layer 832 and MAC layer 830.

After MAC layer block 830 has processed the upstream information, it is then passed to network layer block 834. Network layer block 834 includes switching software 882 for causing the upstream information packet to be switched to an appropriate data network interface on data network interface 802. When a packet is received at the data network interface 802 from an external source, the switching software within network layer 834 passes the packet to MAC layer 830. MAC block 804 then transmits information via a one-way communication medium to downstream modulator and transmitter 806. Downstream modulator and transmitter 806 takes the data (or other information) in a packet structure and converts it to modulated downstream frames, such as MPEG or ATM frames, on the downstream carrier using, for example, QAM 64 modulation (other methods of modulation can be used such as CDMA (Code Division Multiple Access) OFDM (Orthogonal Frequency Division Multiplexing), FSK (FREQ Shift Keying)). The return data is likewise modulated using, for example, QAM 16 or QSPK. According to a specific embodiment, the modulated data is converted from IF electrical signals to RF electrical signals (or vice-versa) using one or more electrical signal converters (not shown). Data from other services (e.g. television) may be added at a combiner 807. An optical converter 808 converts the modulated RF electrical signals to optical signals that can be received and transmitted via Fiber Node 810 to the cable modem hub.

Note that alternate embodiments of the CMTS (not shown) may not include network layer 834. In such embodiments, a CMTS device may include only a physical layer and a MAC layer, which are responsible for modifying a packet according to the appropriate standard for transmission of information over a cable modem network. The network layer 834 of these alternate embodiments of CMTS devices may be included, for example, as part of a conventional router for a packet-switched network. In a specific embodiment, the network layer of the CMTS is configured as a cable line card coupled to a standard router that includes the physical layer block 832 and MAC layer block 830. Using this type of configuration, the CMTS is able to send and/or receive IP packets to and from the data network interface 802 using switching software block 882.

The data network interface 802 is an interface component between external data sources and the cable system. The external data sources transmit data to the data network interface 802 via, for example, optical fiber, microwave link, satellite link, or through various media. The data network interface includes hardware and software for interfacing to various networks such as, for example, Ethernet, ATM, frame relay, etc.

As shown in FIG. 8, CMTS 804 includes a central hardware block 850 including one or more processors 855 and memory 857. These hardware components interact with software and other hardware portions of the various layers within the CMTS. They provide general purpose computing power for much of the software. Memory 857 may include, for example, I/O memory (e.g. buffers), program memory, shared memory, etc. One or more data structures used for implementing the technique of the present invention may reside in such memory. Hardware block 850 may physically reside with the other CMTS components. In one embodiment, the software entities 882, 884, and 886 are implemented as part of a network operating system running on hardware 850. Preferably, at least a part of the upstream/downstream channel change functionality of this invention are implemented in software as part of the operating system. In FIG. 8, such software may be part of MAC layer software 884 and/or the switching software 882, or may be closely associated therewith. Of course, the channel change logic of the present invention could reside in hardware, software, or some combination of the two.

The procedures employed by the CMTS during registration and pre-registration are preferably performed at the MAC layer of the CMTS logic. Thus, in CMTS 804, most of the registration operations would be performed by the hardware and software provided for MAC layer logic 830.

The operations associated with obtaining an IP address for cable modems are preferably implemented at the network layer level 834. As noted, this may involve the CMTS communicating with a DHCP server via data network interface 802, for example.

The upstream/downstream channel change techniques of this present invention may be implemented on various general purpose Cable Modem Termination Systems. In a specific embodiment, the systems of this invention may be specially configured CMTSs such as, for example, specially configured models in the uBR-7200 and/or uBR-10,000 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Although the system shown in FIG. 8 represents one specific CMTS architecture of the present invention, it is by no means the only CMTS architecture on which the present invention can be implemented. For example, other types of interfaces and media could also be used with the CMTS.

Regardless of network device's configuration (for cable plants or otherwise), it may employ one or more memories or memory modules (e.g., memory 857) configured to store program instructions for the network operations and other functions of the present invention described herein. The program instructions may specify an operating system and one or more applications, for example. Such memory or memories may also be configured to store data structures or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

It will be appreciated by one having ordinary skill in the art that the technique of the present invention may be implemented in any computer network having a standardized protocol for utilizing a central termination system (e.g. Head End) to schedule time slots for remote stations or nodes on a return (or upstream) channel. In wireless networks, the central termination system may be referred to as a Head End or wireless base station. In satellite networks, the central termination system may be referred to as a master controlling station.

Other Embodiments

While the discussion to this point has focused on upstream and downstream channel change techniques for cable networks, the technology of the present invention may be applied to any access or shared-access network having a plurality of hosts or nodes which share at least one channel for communicating with at least one "Head End" in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

In general, the methods and apparatus described above may be implemented on a traffic handling device (e.g., a router) for providing upstream and downstream channel change capability in a network having at least one traffic handling device (e.g., another router) that provides normal service to a host. In the wireless system (e.g., represented by FIG. 9) the plurality of nodes or hosts corresponds to the plurality of wireless nodes 950 which use at least one shared access channel to communicate with at least one access control system 922 located at the Head End of the wireless system.

Figure 9:
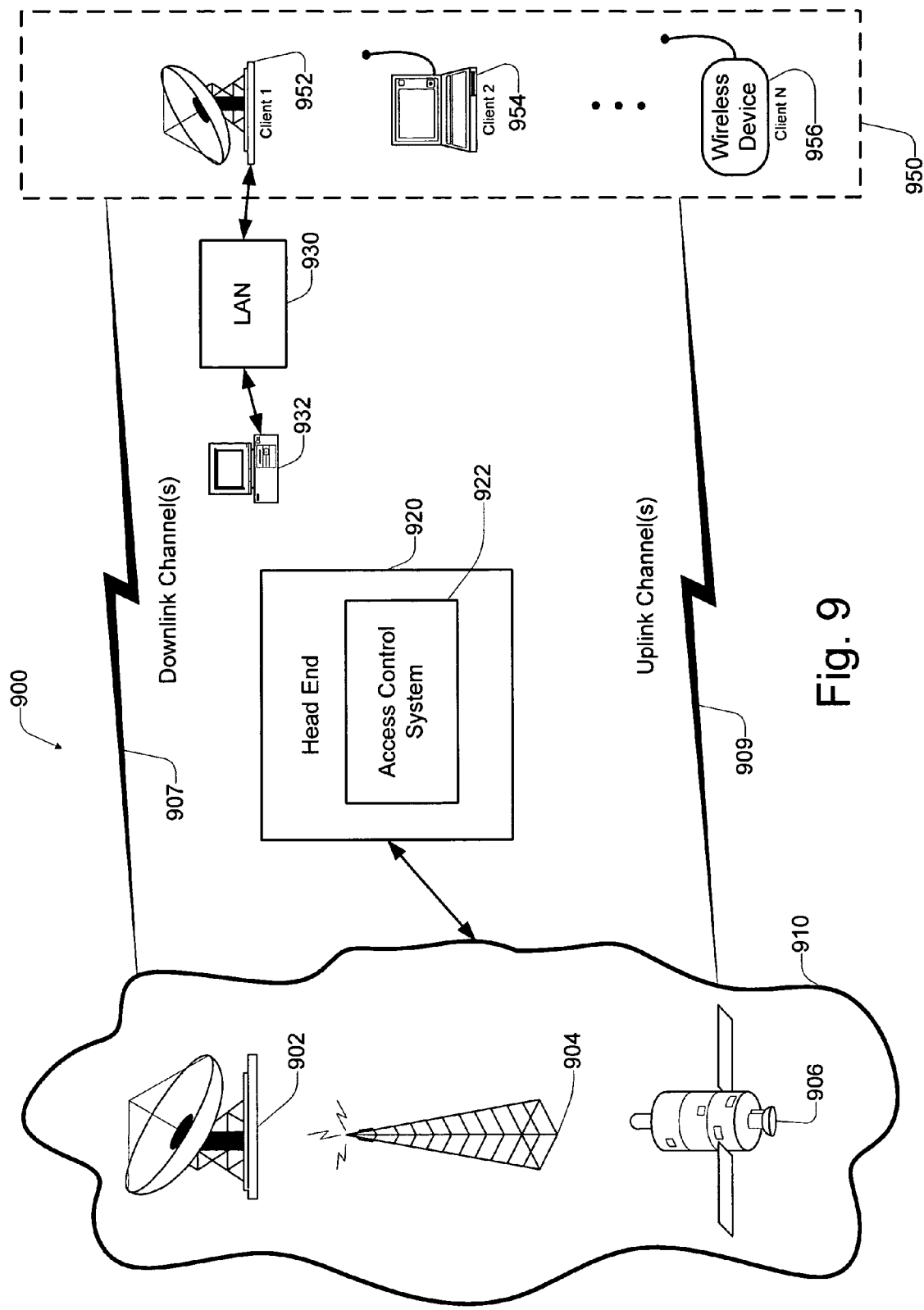
FIG. 9 shows a block diagram of wireless network which may be used for implementing the technique of the present invention.

As shown in FIG. 9, the wireless system includes a central termination system (or Head End) 920. The Head End includes an access controller or access control system (ACS) 922 which communicates with a plurality of wireless nodes 950, and coordinates access between each of the wireless nodes and the Head End 920. The access controller 922 may include memory and at least one processor. In a specific embodiment, the function of the access controller 922 is analogous to that of the CMTS described above with respect to cable modem networks. It may serve as a router as well.

The Head End 920 communicates with a plurality of wireless nodes 950 via any one of a plurality of wireless transmitting and receiving devices 910. As shown in FIG. 9, for example, the plurality of wireless transmitting and receiving devices 910 may include satellite base stations 902, orbital satellites 906, radio towers 904, etc.

In a specific embodiment which is analogous to that of cable modem networks, the Head End 920 of the wireless computer system communicates with the plurality of nodes 950 via one or more downlink channels 907 and one or more uplink channels 909. Each downlink channel 907 is a broadcast-type channel utilized by the Head End to communicate with an associated group of wireless nodes within the wireless network. The uplink channel 909 is a shared-access channel, which is utilized by a group of wireless nodes (analogous to cable modems) to communicate with the Head End 920. The access controller 922 stores registration parameters for the various nodes that it services. It may also store the IP addresses for nodes that it services.

In a specific embodiment of the present invention, the registration process and information is similar to that of the cable network CMTSs described above. Moreover, the technique of the present invention for upstream/downstream channel change capability over a shared access data network may be implemented in wireless system 900.

The wireless devices or nodes 950 may include any one of a number of wireless transmitting/receiving devices. For example, a satellite dish 952 may be used to communicate with the Head End 920 via the uplink and downlink channels. The satellite dish may, in turn, be connected to a local area network (LAN) 930 which, may be further connected to one or more computer systems 932. Another wireless device may be a portable/wireless computer system 954, which is able to transmit and receive information to the Head End via uplink and downlink channels 907 and 909. Other wireless devices 956 may include, for example, wireless telephones, handheld computing devices, etc.

In specific embodiments where the uplink and downlink channels within the wireless system 900 are utilized in a manner similar to that of the upstream and downstream channels of a cable modem network, the above-described channel change techniques may easily be implemented in wireless system 900 using the detailed description of the present invention provided herein. Moreover, the technique of the present invention may be easily implemented in any computer network which uses shared access channels for communicating between a centralized computing system and one or more remote nodes.

It will be appreciated that the technique of the present invention is not limited to cable networks, and may be applied to any access data network which uses at least one shared access communication channel to communicate between a plurality of nodes in the network and a Head End of the network.

It is noted that U.S. Provisional Patent Application Ser. No. 60/159,085 (previously incorporated by reference) includes, as Attachment A, a document entitled, "Dynamic Channel Change Proposal for DOCSIS 1.1", by John T. Chapman. It is to be noted that the Dynamic Channel Change Proposal of Attachment A has been drafted as a proposal for incorporation into the current DOCSIS 1.1 standard. For this reason, the language describing the dynamic channel change proposal has been drafted using a format similar to that of the current DOCSIS specification, whereby a specific embodiment of the DOCSIS standard is defined using absolute and unambiguous terms (such as, for example, the terms "must" and "shall"). It will be appreciated, therefore, that the Dynamic Channel Change Proposal of Attachment A merely defines a specific embodiment of the dynamic channel change technique of the present invention. Alternate embodiments of the dynamic channel changing technique of the present invention may be derived by modifying various features of the specific embodiment defined by the dynamic channel change proposal described herein. Such modifications will be apparent to one having ordinary skill in the art.

Although several preferred embodiments of this invention have been described in detail herein with reference to the accompanying drawings, it is to be understood that the invention is not limited to these precise embodiments, and at various changes and modifications may be effected therein by one

The invention claimed is:

1. A method for facilitating communications between a network node and a Head End of an access network, the access network including a plurality of nodes which communicate with the Head End via at least one upstream channel and at least one downstream channel, the at least one downstream channel including a first downstream channel and a second downstream channel, the method comprising:
communicating between the Head End and a first network node of the plurality of nodes via the first downstream channel;
communicating between the Head End and a second network node of the plurality of nodes via the first downstream channel;
receiving, on a first upstream channel, a bandwidth allocation request from the first network node;
analyzing traffic loads on at least a portion of the at least one upstream and downstream channels, wherein said analyzing includes analyzing traffic loads on the at least one upstream and downstream channels for accommodating the bandwidth allocation request from the first network node;
generating, in response to the analysis of traffic loads, a first communication message, the first communication message including a request to perform a dynamic channel change (DCC) operation, said dynamic channel change request including downstream channel identifier information associated with the second downstream channel, said dynamic channel change request further including instructions for causing the first network node to perform a downstream channel change operation to thereby cause the first network node to receive downstream communications via the second downstream channel;
communicating between the Head End and the first network node via the second downstream channel after successful completion of the downstream channel change operation at the first network node; and
communicating between the Head End and the second network node via the first downstream channel after successful completion of the downstream channel change operation at the first network node.

2. The method of claim 1 wherein the method is implemented at a cable modem termination system (CMTS) of the access network.

3. The method of claim 1 further comprising:
identifying a selected upstream channel suitable for use in accommodating the bandwidth allocation request from the first network node; and
transmitting to the first network node an upstream channel change request which includes instructions for causing the first network node to transmit upstream data via said selected upstream channel.

4. The method of claim 1 wherein said access network is a wireless network.

5. The method of claim 1 wherein said access network is a cable network, said plurality of nodes are cable modems, and wherein said Head End comprises a Cable Modem Termination System (CMTS).

6. A method for facilitating communications between a network node and a Head End of an access network, the access network including a plurality of nodes which communicate with the Head End via at least one upstream channel and at least one downstream channel, the at least one downstream channel including a first downstream channel and a second downstream channel, the method comprising:
communicating between the Head End and a first network node of the plurality of nodes via the first downstream channel;
communicating between the Head End and a second network node of the plurality of nodes via the first downstream channel;
analyzing traffic loads on at least a portion of the at least one upstream and downstream channels, wherein said analyzing includes analyzing traffic loads on the at least one upstream and downstream channels for accommodating the bandwidth allocation request from the first network node;
generating, in response to the analysis of traffic loads, a first communication message, the first communication message including a request to perform a dynamic channel change (DCC) operation, said dynamic channel change request including downstream channel identifier information associated with the second downstream channel, said dynamic channel change request further including instructions for causing the first network node to perform a downstream channel change operation to thereby cause the first network node to receive downstream communications via the second downstream channel;
allocating at least one bandwidth resource assignment on the second downstream channel for use in communicating with the first network node;
communicating between the Head End and the first network node via the second downstream channel after successful completion of the downstream channel change operation at the first network node; and
communicating between the Head End and the second network node via the first downstream channel after successful completion of the downstream channel change operation at the first network node.

7. The method of claim 6 further comprising:
detecting that the first network node is successfully receiving transmissions on the second downstream channel; and
de-allocating at least one bandwidth resource assignment associated with the first network node on the first downstream channel.

8. The method of claim 6 further comprising:
receiving a dynamic channel change response from the first network node, wherein said dynamic channel change response has been generated in response to the first network node receiving the dynamic channel change request.

9. The method of claim 6 further comprising:
de-allocating the at least one bandwidth resource assignment in response to not receiving a dynamic channel change response from the first network node after a first time period has elapsed.

10. The method of claim 9 further comprising:
re-transmitting the dynamic channel change request to the first network node in response to not receiving a dynamic channel change response from the first network node after a second time period has elapsed.

11. The method of claim 8 further comprising:
de-allocating the at least one bandwidth resource assignment in response to detecting that the first network node is not successfully receiving transmissions on the second downstream channel.

12. The method of claim 6 wherein the method is implemented at a cable modem termination system (CMTS) of the access network.

13. The method of claim 6 wherein said access network is a wireless network.

14. The method of claim 6 wherein said access network is a cable network, said plurality of nodes are cable modems, and wherein said Head End comprises a Cable Modem Termination System (CMTS).

15. A system for facilitating communications between a network node and a Head End of an access network, the access network including a plurality of nodes which communicate with the Head End via at least one upstream channel and at least one downstream channel, the at least one downstream channel including a first downstream channel and a second downstream channel, the system comprising:
  at least one processor;
  at least one interface; and
  memory;
  the system being operable to:
  communicate between the Head End and a first network node of the plurality of nodes via the first downstream channel;
  communicate between the Head End and a second network node of the plurality of nodes via the first downstream channel;
  receive, on a first upstream channel, a bandwidth allocation request from the first network node;
  analyze traffic loads on at least a portion of the at least one upstream and downstream channels, wherein said analyzing includes analyzing traffic loads on the at least one upstream and downstream channels for accommodating the bandwidth allocation request from the first network node;
  generate, in response to the analysis of traffic loads, a first communication message, the first communication message including a request to perform a dynamic channel change (DCC) operation, said dynamic channel change request including downstream channel identifier information associated with the second downstream channel, said dynamic channel change request further including instructions for causing the first network node to perform a downstream channel change operation to thereby cause the first network node to receive downstream communications via the second downstream channel;
  communicate between the Head End and the first network node via the second downstream channel after successful completion of the downstream channel change operation at the first network node; and
  communicate between the Head End and the second network node via the first downstream channel after successful completion of the downstream channel change operation at the first network node.

16. The system of claim 15 wherein the system is implemented at a cable modem termination system (CMTS) of the access network.

17. The system of claim 15 being further operable to:
  identify a selected upstream channel suitable for use in accommodating the bandwidth allocation request from the first network node; and
  transmit to the first network node an upstream channel change request which includes instructions for causing the first network node to transmit upstream data via said selected upstream channel.

18. The system of claim 15 wherein said access network is a wireless network.

19. The system of claim 15 wherein said access network is a cable network, said plurality of nodes are cable modems, and wherein said Head End comprises a Cable Modem Termination System (CMTS).

20. A system for facilitating communications between a network node and a Head End of an access network, the access network including a plurality of nodes which communicate with the Head End via at least one upstream channel and at least one downstream channel, the at least one downstream channel including a first downstream channel and a second downstream channel, the system comprising:
  at least one processor;
  at least one interface; and
  memory;
  the system being operable to:
  communicate between the Head End and a first network node of the plurality of nodes via the first downstream channel;
  communicate between the Head End and a second network node of the plurality of nodes via the first downstream channel;
  analyze traffic loads on at least a portion of the at least one upstream and downstream channels, wherein said analyzing includes analyzing traffic loads on the at least one upstream and downstream channels for accommodating the bandwidth allocation request from the first network node;
  generate, in response to the analysis of traffic loads, a first communication message, the first communication message including a request to perform a dynamic channel change (DCC) operation, said dynamic channel change request including downstream channel identifier information associated with the second downstream channel, said dynamic channel change request further including instructions for causing the first network node to perform a downstream channel change operation to thereby cause the first network node to receive downstream communications via the second downstream channel;
  allocate at least one bandwidth resource assignment on the second downstream channel for use in communicating with the first network node;
  communicate between the Head End and the first network node via the second downstream channel after successful completion of the downstream channel change operation at the first network node; and
  communicate between the Head End and the second network node via the first downstream channel after successful completion of the downstream channel change operation at the first network node.

21. The system of claim 20 being further operable to:
  detect that the first network node is successfully receiving transmissions on the second downstream channel; and
  de-allocate at least one bandwidth resource assignment associated with the first network node on the first downstream channel.

22. The system of claim 20 being further operable to:
  receive a dynamic channel change response from the first network node, wherein said dynamic channel change response has been generated in response to the first network node receiving the dynamic channel change request.

23. The system of claim 20 being further operable to:
  de-allocate the at least one bandwidth resource assignment in response to not receiving a dynamic channel change response from the first network node after a first time period has elapsed.

24. The system of claim 23 being further operable to:
re-transmit the dynamic channel change request to the first network node in response to not receiving a dynamic channel change response from the first network node after a second time period has elapsed.

25. The system of claim 22 being further operable to:
de-allocate the at least one bandwidth resource assignment in response to detect that the first network node is not successfully receiving transmissions on the second downstream channel.

26. The system of claim 20 wherein the system is implemented at a cable modem termination system (CMTS) of the access network.

27. The system of claim 20 wherein said access network is a wireless network.

28. The system of claim 20 wherein said access network is a cable network, said plurality of nodes are cable modems, and wherein said Head End comprises a Cable Modem Termination System (CMTS).

29. A system for facilitating communications between a network node and a Head End of an access network, the access network including a plurality of nodes which communicate with the Head End via at least one upstream channel and at least one downstream channel, the at least one downstream channel including a first downstream channel and a second downstream channel, the system comprising:
at least one processor;
memory;
means for communicating between the Head End and a first network node of the plurality of nodes via the first downstream channel;
means for communicating between the Head End and a second network node of the plurality of nodes via the first downstream channel;
means for receiving, on a first upstream channel, a bandwidth allocation request from the first network node;
means for analyzing traffic loads on at least a portion of the at least one upstream and downstream channels, wherein said analyzing includes analyzing traffic loads on the at least one upstream and downstream channels for accommodating the bandwidth allocation request from the first network node;
means for generating, in response to the analysis of traffic loads, a first communication message, the first communication message including a request to perform a dynamic channel change (DCC) operation, said dynamic channel change request including downstream channel identifier information associated with the second downstream channel, said dynamic channel change request further including instructions for causing the first network node to perform a downstream channel change operation to thereby cause the first network node to receive downstream communications via the second downstream channel;
means for communicating between the Head End and the first network node via the second downstream channel after successful completion of the downstream channel change operation at the first network node; and
means for communicating between the Head End and the second network node via the first downstream channel after successful completion of the downstream channel change operation at the first network node.

30. A system for facilitating communications between a network node and a Head End of an access network, the access network including a plurality of nodes which communicate with the Head End via at least one upstream channel and at least one downstream channel, the at least one downstream channel including a first downstream channel and a second downstream channel, the system comprising:
at least one processor;
memory;
means for communicating between the Head End and a first network node of the plurality of nodes via the first downstream channel;
means for communicating between the Head End and a second network node of the plurality of nodes via the first downstream channel;
means for analyzing traffic loads on at least a portion of the at least one upstream and downstream channels, wherein said analyzing includes analyzing traffic loads on the at least one upstream and downstream channels for accommodating the bandwidth allocation request from the first network node;
means for generating, in response to the analysis of traffic loads, a first communication message, the first communication message including a request to perform a dynamic channel change (DCC) operation, said dynamic channel change request including downstream channel identifier information associated with the second downstream channel, said dynamic channel change request further including instructions for causing the first network node to perform a downstream channel change operation to thereby cause the first network node to receive downstream communications via the second downstream channel;
means for allocating at least one bandwidth resource assignment on the second downstream channel for use in communicating with the first network node;
means for communicating between the Head End and the first network node via the second downstream channel after successful completion of the downstream channel change operation at the first network node; and
means for communicating between the Head End and the second network node via the first downstream channel after successful completion of the downstream channel change operation at the first network node.

* * * * *

UNITED STATES PATENT AND TRADEMARK OFFICE
CERTIFICATE OF CORRECTION

PATENT NO. : 7,656,890 B2 Page 1 of 1
APPLICATION NO. : 11/484288
DATED : February 2, 2010
INVENTOR(S) : Chapman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 357 days.

Signed and Sealed this

Twenty-eighth Day of December, 2010

David J. Kappos
*Director of the United States Patent and Trademark Office*